(12) United States Patent
Oppermann et al.

(10) Patent No.: US 10,788,040 B2
(45) Date of Patent: Sep. 29, 2020

(54) ADAPTATION OF THE DELIVERY HEAD OF A CENTRIFUGAL PUMP TO A CHANGING VOLUMETRIC FLOW RATE

(71) Applicant: WILO SE, Dortmund (DE)

(72) Inventors: Jens Oppermann, Schwerte (DE); Ana Constantin, Aachen (DE)

(73) Assignee: WILO SE, Dortmund (DE)

( * ) Notice: Subject to any disclaimer, the term of this patent is extended or adjusted under 35 U.S.C. 154(b) by 467 days.

(21) Appl. No.: 15/528,974

(22) PCT Filed: Oct. 22, 2015

(86) PCT No.: PCT/EP2015/002089
§ 371 (c)(1),
(2) Date: Jun. 9, 2017

(87) PCT Pub. No.: WO2016/091342
PCT Pub. Date: Jun. 16, 2016

(65) Prior Publication Data
US 2017/0268516 A1    Sep. 21, 2017

(30) Foreign Application Priority Data
Dec. 8, 2014 (DE) .......................... 10 2014 018 020

(51) Int. Cl.
*F04D 15/00* (2006.01)
*F24D 19/10* (2006.01)
(Continued)

(52) U.S. Cl.
CPC ........... *F04D 15/0066* (2013.01); *F04D 1/00* (2013.01); *F04D 13/06* (2013.01);
(Continued)

(58) Field of Classification Search
CPC ............ F04D 15/0066; F04D 15/0088; F04D 27/004; F04D 1/00; F04D 13/06;
(Continued)

(56) References Cited

U.S. PATENT DOCUMENTS

| 6,208,497 | B1 * | 3/2001 | Seale ........................ F01L 9/04 361/154 |
| 2002/0100275 | A1 * | 8/2002 | Lisniansky ........... F15B 11/024 60/325 |
| 2016/0146202 | A1 * | 5/2016 | Zhang ...................... F04B 1/26 417/53 |

FOREIGN PATENT DOCUMENTS

| CN | 1033847689 A | 11/2013 | |
| DE | 102011012211 A | 8/2012 | |
| DE | 102011012211 A1 * | 8/2012 | .............. F04B 51/00 |

* cited by examiner

*Primary Examiner* — Essama Omgba
*Assistant Examiner* — Christopher J Brunjes
(74) *Attorney, Agent, or Firm* — Andrew Wilford

(57) ABSTRACT

The present invention relates to a method of operating an electric motor-driven centrifugal pump (3) in a hydraulic system (4) having at least one self-controlled load, where a gradient ($dQ_{akt}/dt$) of the volumetric flow rate ($Q_{akt}$) of the centrifugal pump (3) is determined and the current set-point delivery head ($H_{soll}$) of the centrifugal pump (3) is calculated from a mathematical operation on the gradient ($dQ_{akt}/dt$) weighted with a gain factor (K) and the last specified set-point delivery head ($H_{soll,alt}$). The operation describes a positive feedback between the set-point delivery head ($H_{soll}$) and the volumetric flow rate ($Q_{akt}$). The gain factor (K) is determined from a calculation instruction that is modified dynamically during operation of the centrifugal pump (3) taking into consideration the current operating point of the centrifugal pump (3) and taking into consideration a current and/or at least one past state of the hydraulic system (4).

29 Claims, 5 Drawing Sheets

(51) Int. Cl.
 *F04D 1/00* (2006.01)
 *F04D 13/06* (2006.01)
(52) U.S. Cl.
 CPC ..... *F04D 15/0088* (2013.01); *F24D 19/1012* (2013.01); *F24D 2220/0207* (2013.01); *Y02B 30/745* (2013.01)
(58) Field of Classification Search
 CPC ......... F24D 19/1012; F24D 2220/0207; F04B 49/065; Y02B 30/745
 See application file for complete search history.

ADAPTATION OF THE DELIVERY HEAD OF A CENTRIFUGAL PUMP TO A CHANGING VOLUMETRIC FLOW RATE

CROSS REFERENCE TO RELATED APPLICATIONS

This application is the US-national stage of PCT application PCT/EP2015/002089 filed 22 Oct. 2015 and claiming the priority of German patent application 102014018020.4 itself filed 8 Dec. 2014.

The present invention relates to a method of operating an electric motor-driven centrifugal pump in a hydraulic system, in particular a heating pump having at least one self-controlled load, where a gradient of the volumetric flow rate of the centrifugal pump is determined and the current set-point delivery head of the centrifugal pump is calculated from a mathematical operation on the gradient weighted with a gain factor and the last specified set-point delivery head, and the operation describes a positive feedback between the set-point delivery head and the volumetric flow rate, and the gain factor is determined from a calculation instruction.

A method of this type is disclosed in German patent application DE 10 2011 012 211. Here, the set-point delivery head is controlled in accordance with the volumetric flow rate along an adjustable underlying characteristic curve that is defined by a characteristic curve set-point value, and the characteristic curve set-point value is raised when the volumetric flow rate increases and reduced when the volumetric flow rate decreases. Thus, the characteristic curve in the pump characteristic diagram is moved constantly, achieving a dynamic control of the pump that is adapted to the actual requirements of the hydraulic system. The characteristic curve is increased and reduced by the addition of a positive feedback value to the last characteristic curve set-point value that is correspondingly positive when the volumetric flow rate increases and negative when the volumetric flow rate decreases. The underlying characteristic curve may be a $\Delta p$–c characteristic curve. In this case, the predetermined characteristic curve set-point value corresponds to a delivery head set-point value of the pump that is kept constant regardless of the volumetric flow rate. The underlying characteristic curve may also, however, be a $\Delta p$–v characteristic curve.

The positive feedback value to be added is determined according to a fixed calculation instruction during operation of the pump, and this instruction may, according to DE 10 2011 012 211, be defined by a linear relationship between the positive feedback value and the volumetric flow rate gradient. This means that the greater the positive feedback value is, the greater the change in volumetric flow rate is. In the above-cited publication, the calculation instruction is the same for the entire operating range of the pump. In addition, for a use-specific operation of the pump, the method requires checking limit values for the underlying characteristic curve that only allow for the method to be used in a limited operating range of the characteristic diagram of the pump.

The positive feedback between the delivery head and the change in volumetric flow rate ensures a prompt reaction of the delivery head to the change in the volumetric flow rate, for example when thermostatic valves located in the hydraulic system open or close quickly. However, the volumetric flow rate changes slower in the control range of the thermostatic valves, i.e. in the partial load range of the pump, so that a delivery head with positive feedback that is too weak may remain at a value that is either too high or too low. The former case would not lead to energy-efficient operation, because the pump is working with the excessively high delivery pressure against closed valves. The latter case would lead to insufficient supply to the load. Moreover, with an excessively strong positive feedback, the delivery head would react very strongly to an increase in the volumetric flow rate. The additional pressure built up by the pump would press against the at least partially closed valves that only gradually open further and allow a greater volumetric flow rate to flow. The valves would then settle and try to close again, which leads to a reduction of the volumetric flow rate and, via the positive feedback, to a reduction of the set-point delivery head. This in turn has the consequence of an excessive decrease in the volumetric flow rate, and the valves would control against this trend by opening. The hydraulic system overall then experiences an oscillation in the delivery head that stems from the excessively high value of the gain factor. In other words, the hydraulic system is susceptible to oscillations if the gain factor is too great.

Operation of a centrifugal pump in a hydraulic system with the use of a positive feedback between the delivery head and the change in volumetric flow rate therefore requires suitable selection of the positive feedback value, i.e. the gain factor for the positive feedback. A gain factor that is too high leads to oscillation in the system, and a gain factor that is too low leads to an insufficient supply to the load or to non-energy-optimal operation. The optimal or ideal gain factor is located somewhere between these two extremes. A first object to be attained by the present invention is therefore to achieve optimum adjustment of the gain factor.

One should be take into consideration that different gain factors are optimal for different states of the hydraulic system, in particular for different load states (partial load, full load). Another object to be attained by the present invention is therefore to determine—and adjust accordingly—the optimum gain factor, dynamically during operation of the pump.

Another object to be attained by the present invention is to provide a control that can be used for any pump. Therein, the control is not only to be usable for different pumps but also to work even with pumps that are not adapted to the hydraulic system but instead are oversized.

These objects are attained by a control method having the features of claim 1. Advantageous embodiments of the present invention are set forth in the subsidiary claims.

According to the present invention, the calculation instruction is adapted dynamically during operation of the centrifugal pump taking into consideration the current operating point and/or at least one past state of the hydraulic system.

Since the current operating point of the centrifugal pump changes constantly, the calculation instruction is also constantly being changed. The method described here has an advantage over the prior art in requiring absolutely no built-in manual specification of a characteristic curve, because there is no classical control of the pump along a rigid characteristic curve taking place. In this respect, the process of putting the centrifugal pump into service is simplified, and also becomes safer, since wrong adjustments are not possible.

The method according to the present invention accordingly makes no use of classical rigid characteristic curve control in which the delivery head of the centrifugal pump is controlled in accordance with the delivery flow thereof along a set fixed characteristic curve. This is commonly implemented with heating pumps, and results in the operating points of the pump in the HQ diagram lying exclusively on the set characteristic curve. According to the present invention, instead, an algorithm is used that makes it possible for the pump, under this scheme, to achieve any operating point completely freely in the HQ diagram, and also to adjust the operating point from an optimum-energy perspective depending on the current state of the heating system.

Instead of a typical characteristic curve control, a newly calculated set-point delivery head is held until a new set-point delivery head is calculated. During this time, the pump is held at the constant set-point delivery head corresponding to an underlying Δp–c control. Then, a new set-point delivery head arises only if the volumetric flow rate changes, because otherwise the gradient is zero. Moreover, the set-point delivery head can be cyclically recalculated. This means that the method according to the present invention can be repeated cyclically, preferably in intervals between 3 seconds and 15 minutes, in particular every 30 seconds. This also signifies that the set-point delivery head remains the same at least for the duration of one interval, even if the volumetric flow rate changes. If this is the case, then a new set-point delivery head occurs only at the start of an interval. The pump then automatically seeks out the respective optimal-energy operating point dynamically during operation, in accordance with a newly established load state of the hydraulic system.

Then, it is only still necessarily to specify a start value $H_{start}$ for the set-point delivery head that can be programmed as a factory default and may be, for example, a middle value between the maximum delivery head $H_{max}$ occurring with a volumetric flow rate of zero and the minimum delivery head $H_{min}$, as is expressed by the following equation.

$$H_{start}=H_{min}+(H_{max}-H_{min})/2.$$

Moreover, the method according to the present invention has an advantage in that the method can be used in the entire characteristic diagram of the pump, and not only within certain limits.

The method is preferably used with a heating pump or a cooling pump. The hydraulic system may, consequently, preferably be a heating system or a cooling system, or a combination heating/cooling system.

The hydraulic system comprises at least one self-controlled load. The system may basically also have two or more, in particular a large number of loads. Loads may be, for example, heating elements or heating circuits of an underfloor heating system, or cooling elements or cooling zone of an overhead cooling system. At least one of the two or more loads is then self-controlled. However, two or more of the loads may also be self-controlled. However, not all of the loads need necessarily be self-controlled, or even necessarily controlled. "Self-control" is understood in this context to me that the corresponding load has assigned thereto an actuator that automatically controls the volumetric flow rate through the load, and the control may be directed toward, for example, a certain target temperature. The actuator is installed in the forward path or return path of the load. Such an actuator may entail, for example, a thermostat, an engine valve, or an electrothermal control valve.

The state of the hydraulic system may be described through the state of the one or plurality of self-controlling load(s) or through the state of the actuator(s). Depending on the degree of opening of the actuators, in the case of valves, the actuators each cause a hydraulic resistance that manifests at the place of the centrifugal pump as a total resistance, and can be described with a system characteristic curve $H_A(Q)$ that describes the delivery head H as a mathematical function of the volumetric flow rate A. The state of the hydraulic system may be described, for example, with the slope of the system characteristic curve. The state may also, however, already be described with a single point on the system characteristic curve, because a mathematical representation of the system characteristic curve is generally known. Different points are suitable here, as described below.

According to a preferred embodiment, the mathematical operation is the addition of the gradient, having been weighted with the gain factor, to the last specified set-point delivery head. The gain factor is then always positive. This achieves a positive feedback, because the set-point delivery head is increased when the volumetric flow rate increases, and reduced when the volumetric flow rate decreases. It should be noted that such a positive feedback is also, of course, achieved by subtraction instead of addition, with the use of a negative gain factor. However, because this ultimately also corresponds to an addition, this is not considered a true alternative.

With the method according to the present invention, it is not only proposed to adapt the calculation instruction for the gain factor in accordance with the state of the hydraulic system, but rather a suitable calculation instruction is also proposed.

It is thus advantageous, for example, when the calculation instruction describes a functional relationship between the current operating point and a target point, and the gain factor is calculated from this functional relationship. Suitably, for this purpose, the current operating point of the centrifugal pump is determined first.

A fundamental consideration for forming the calculation instruction proceeds from the assumption of considering two extremes that relate to the state or state change of the hydraulic system or of the actuators controlling the loads, and relate to a corresponding reaction of the delivery head to this state or state change.

Therein, the first extreme is the one where the hydraulic resistance of the hydraulic system is at a minimum, the second extreme being the one where the resistance is at a maximum. The resistance is at a minimum when, for example, all of the valves have been opened, and at a maximum when, for example, all of the valves have been closed. If all of the valves open, the centrifugal pump must also work the required performance. In order to meet this requirement, the current operating point of the centrifugal pump will change in the direction of a maximum pump curve. However, the design point of the pump for the maximum load generally lies below the maximum pump curve, in order to yield a control reserve. At the maximum pump curve, the centrifugal pump generally proceeds with a maximum rotational speed, such that the maximum pump curve delimits the characteristic diagram of the pump in the direction of an increasing delivery flow and/or an increasing delivery head.

The maximum rotational speed may be, for example, the rotational speed with which the pump can actually be operated continuously from a mechanical or hydromechanical point of view. There is, however, also the possibility that the pump has a power limit that sets a rotational speed that is lower than this maximum rotational speed as the maximum rotational speed, if a certain electrical power maximum is exceeded in case of full load. This leads to the maximum pump curve being flattened and forming a nearly straight line where the power limit is set.

A quick response to the first extreme would be energetically inefficient, because there may be oscillations, while a slower response could lead to insufficient supply. An ideal response therefore lies therebetween.

If all of the valves have been closed, the pump will drive at minimum rotational speed, i.e. will have an operating point on or near the minimum pump curve. If the valves close, such an operating point in the direction of or even on the minimum pump curve will be correspondingly pursued. A quicker response could, in this case, lead to insufficient supply to the loads, while a slower response would be energetically inefficient. Here, too, an ideal response lies therebetween.

This consideration yields the realization that a target point in the direction of which a change in the operating state of the centrifugal pump is oriented can be used for calculating an ideal gain factor K, as previously mentioned. A "target point" accordingly is understood to mean a point that is described with the same physical quantities as an operating point of the centrifugal pump and can be represented, in particular in the HQ diagram.

Ideally, the target point defines the target, more or less a final state for the change in the operating state of the centrifugal pump. The target point may therefore lie on the maximum pump curve or on the minimum pump curve. The target point need not necessarily lie on the maximum or minimum pump curve, however. Thus, by virtually of substantially having a mathematical meaning, the target point may possible lie outside of the characteristic diagram of the pump, in particular beyond the maximum or minimum pump curve. The target point may even belong to a negative volumetric flow rate. Furthermore, the target point may lie on a curve that is flattened relative to the maximum pump curve, in the case where a power limit is used. This curve, when outside the intervening power limit of the maximum pump curve and during the intervening power limit, corresponds to a straight line that delimits the characteristic diagram and cuts off those operating points at which a certain power limit value is exceeded.

For the ideal gain factor K, it is a matter of from which operating point the centrifugal pump approaches the final state in the first or second extreme. If the current operating point is close to the final state, only a slight response to the state change of the system is needed. Otherwise, it is advisable to select a greater gain factor. For this reason, it is advantageous to take the current operating point of the centrifugal pump into account in the calculation instruction.

According to one advantageous embodiment, the increase of a straight gauge line between the current operating point and the target point is determined on the basis of the use of a target point to determine the gain factor and used as the gain factor. This straight gauge line also represents a characteristic curve in a certain manner, but the centrifugal pump is not controlled along this characteristic curve in the sense of a Δp–v control. Then, on the one hand, the characteristic curve is therefore always being changed again in the slope thereof, because the current operating point of the centrifugal pump changes, while on the other hand the set-point delivery head at least remains the same in the case of cyclic recalculation for a duration of one cycle, such that the centrifugal pump is controlled in any case along the straight gauge line in steps of Δp–c characteristic curves approximating the straight gauge line.

Studies have shown that the ideal gain factor is different when valves are opening, i.e. when the volumetric flow rate is increasing, than the ideal gain factor for when valves are closing, i.e. when the volumetric flow rate is decreasing. It is therefore advantageous to use different target points, consequently, different straight gauge lines and thus different vales for the gain factor, for upward and downward changes of the volumetric flow rate. In the case of equal values, the system states for the opening and closing of the valves are on the same straight gauge line, at least so long as there is no movement on the maximum pump curve. In this case, there occurs a parallel shifting of the straight gauge line for the opening and closing of the valves.

In the case of the shown first extreme, the centrifugal pump must cover an increased power demand. To prevent insufficient supply from occurring, the centrifugal pump must increase the power or rotational speed during the increase in volumetric flow rate due to the opening valves. The centrifugal pump thus pursues an operating state that is above the current operating point. Preferably, therefore, the target point in the case of a positive gradient is an upper target point that is characterized by a volumetric flow rate greater than the volumetric flow rate of the current operating point. Preferably, also, the delivery head in the upper target point is greater than the delivery head of the current operating point. If the current operating point is regarded as the origin of a Cartesian coordinate system, the upper target point is in the first quadrant in this case. However, this need not necessarily be the case, is shown below. Thus, the target point may also lie in the fourth quadrant. This is the case when the volumetric flow rate is greater in the upper target point than at the current operating point, but the delivery head is smaller than that of the current operating point. In this case, however, the slope of the straight gauge line, and thus, the gain factor, would be negative. In order to bring this case under control, the calculated gain factor may be limited to a minimum value of zero. In this case, the set-point delivery head remains unchanged.

In the case of the shown second extreme, the centrifugal pump may reduce the power in order not to work against the closed valves and in order to conserve energy. The centrifugal pump thus ideally pursues an operating state that is below the current operating point. Preferably, therefore, the target point in the case of a negative gradient is a lower target point that is characterized by a volumetric flow rate smaller than the current volumetric flow rate. Preferably, also, the delivery head in the lower target point is smaller than the delivery head of the current operating point. If the current operating point is regarded as the origin of a Cartesian coordinate system, the lower target point is in the third quadrant in this case. This need not necessarily be the case, however. Thus, the target point may also lie in the second quadrant. This is the case when the volumetric flow rate is smaller in the lower target point than at the current operating point, but the delivery head is greater than that of the current operating point. In this case, as well, however, the slope of the straight gauge line, and thus, the gain factor, would be negative. Here, too, in order to bring this case under control, the calculated gain factor may be limited to a minimum value of zero. In this case, the set-point delivery head remains unchanged.

As shown, the centrifugal pump pursues different final states when the valves are closing and when the valves are opening, such that it is advisable to use in each case a target point for one of the two directions in which the volumetric flow rate can change. This then results either in the straight gauge line to the upper target point or the straight gauge line to the lower target point. Technically, then, the gain factor may be calculated from the slope of either one straight gauge line or of the other straight gauge line, depending on in which direction of the state of the hydraulic system changes.

However, alternatively, it is technically also possible to always take both target points into consideration and assess the slopes of both straight gauge lines. This means that two gain factors, one from each of the two straight gauge lines, are calculated at all times. Thus, it is possible to determine a first gain factor corresponding to the slope of a first straight gauge line between the current operating point and the upper target point, and a second gain factor corresponding to the slope of a second straight gauge line between the current operating point and the lower target point, and the first gain factor is used if the gradient is positive and the second gain factor is used if the gradient is negative. This method variant accordingly differs from the previously described variant, inter alia, in that the case distinction with respect to the sign of the gradient is only made after the gain factors are calculated. One advantage of this variant is that the gain factors are immediately available when the gradient or the sign thereof is known. However, here, two gain factors always need to be calculated, which doubles the computational effort.

In order to take the current or future state of the hydraulic system into consideration in the calculation instruction, the current and/or a past system characteristic curve of the hydraulic system may be determined, and a point on this system characteristic curve that forms the upper target point may be determined.

With regard to the first extreme, it has proven especially advantageous when the upper target point is the intersection between the current or a past system characteristic curve and the maximum pump curve of the centrifugal pump. Accordingly, this intersection may be determined first and used as the upper target point. This signifies that the upper target point lies not only on the system characteristic curve but also on the maximum pump curve. This is, in any case, advantageous when the upper target point simultaneously involves a real operating point, i.e. such a point that can be achieved by the centrifugal pump or is also actually achieved in the actual use of the centrifugal pump in the hydraulic system. This is, however, not necessarily the case.

For example, the centrifugal pump could be oversized for use in the hydraulic system, so as to never reach an operating point on the maximum pump curve. In this case, it is useful when it is not the intersection of the system characteristic curve with the maximum pump curve that is determined, but rather the intersection thereof with a pump curve lying thereunder, i.e. with which a certain rotational speed lower than the maximum rotational speed occurs. The certain rotational speed is then advantageously the greatest rotational speed that would also actually by driven by the oversized pump.

It may therefore be provided that the centrifugal pump monitors the maximum rotational speed for a certain length of time, and first the intersection with the maximum pump curve is used as the upper target point, but at the end of the length of time the greatest rotational speed that the centrifugal pump is driven is checked, and then the intersection of the pump curve associated with this greatest rotational speed with the current or a past system characteristic curve is determined and used as the upper target point. The upper target point is moved downward thereby.

According to another advantageous embodiment, the past system characteristic curve is the one that is flattest within a past reference period. The flattest system characteristic curve is the one that has the least slope. If the system characteristic curve is described, for example, mathematically as a parabola in the manner of $H_a=k\times Q$, then the flattest system characteristic curve $H_a$ has the smallest coefficient k. This belongs to a system state with the widest-open valves in the hydraulic system.

For control according to the present invention, this means that the intersection between a past system characteristic curve of the hydraulic system of a predetermined reference period and a pump curve of the centrifugal pump at which there is the greatest volumetric flow rate is used as the upper target point. As a result, the upper target point lies in a full-load case. The full-load case may vary depending on the season and on the scope of use of the hydraulic system. Thus, for example, it is not necessary to always actually use all of the loads. Loads may be arranged in seldom-used spaces, such as guest rooms or store rooms. While use of all of the loads represents a global full-load case, the use of all other leads except the seldom-used loads is, however, a relative full-load case, that in any case requires the greatest energy expenditure, especially heat, relative to a given reference period.

Identifying the relative or absolute full-load case requires observing the system characteristic curve over the entire reference period.

The reference period may be longer or shorter, depending on the hydraulic system. In the case of a heating or cooling system, the heating and cooling processes repeat daily due to the user's or users' everyday life. Therefore, approximately the same states are initiated every 24 hours in the hydraulic system. For this reason, the reference period may suitably correspond to 24 hours. A longer or shorter reference period may also be selected, however, amounting, for example, to between 12 and 48 hours. With a shorter reference period of, for example, 12 hours, different flattest system characteristic curves maybe used for the day and for the night. Moreover, with a longer reference period of, for example, 48 hours, the flattest system characteristic curves may be determined over two days, for example, over a weekend, during which there may be a different heating behavior.

Preferably, a moving reference period is used. This is advantageous in that jumps can be avoided when the flattest system characteristic curve is being captured. Alternatively, knowledge of the previously identified system characteristic curves, which is optionally stored in a memory, could be deleted at the end of the reference period. This means then, however, that any knowledge is gone and the method must begin again in order to determine a system characteristic curve, in particular to find the flattest one. This is prevented by the use of a moving reference period, because, at every point in time, the flattest system characteristic curve of the reference period that ends at this point in time is known.

In order to identify the flattest system characteristic curve, the current system characteristic curve of the hydraulic system may be repeatedly determined and the flattest system characteristic curve may then be determined from the set of determined system characteristic curves. It can be readily understood that a determined current system characteristic curve becomes a past system characteristic curve as soon as a new current system characteristic curve has been determined.

The determination of a system characteristic curve is known per se in the prior art. Thus, for example, a mathematical description of the system characteristic curve may be applied, and the coefficients contained therein may be calculated. For a hydraulic system, a parabolic equation $H_a=k\times Q^2+c_x$ may implemented in the simplest case. In the case of a heating or cooling system, no geodetic head exists, such that $c_x=0$, if there is no check valve present. Then, only the coefficient k of the parabola need be determined, which can easily be done from the known values for the delivery flow Q and the delivery head in an operating point of the centrifugal pump, on the basis of $k=Q^2/H_A$. If, however, a check valve is present in the hydraulic system, then $c_x$ is different from zero, because the opening pressure of the check valve must be overcome so that a delivery flow greater than zero can be present. In this case, two parameters k and $c_x$ are to be determined, which can easily be done from two operating points of the centrifugal pump.

In order to now determine the flattest one from each of the current system characteristic curves that have been determined, the coefficient k of each system characteristic curve may be stored and then the minimum value of k may be determined from the set of stored values, wherein then the flattest one is the system characteristic curve to which the parameter k having the lowest value belongs. Then, advantageously, the intersection between this flattest system characteristic curve and a pump curve, in particular the maximum pump curve of the centrifugal pump (the characteristic curve at maximum rotational speed) may be used as the upper target point.

If a suitable upper target point on a pump curve is to be found by the flattest system characteristic curve, then, as an alternative to storing the coefficient k, the intersection of a determined current system characteristic curve with the pump curve, in particular the maximum pump curve may be immediately determined therefrom. Here, then, the volumetric flow rate in this intersection is important. This volumetric flow rate may be stored, and then the volumetric flow rate that is greatest can be determined from the set of stored values. Then this volumetric flow rate belongs to the intersection of the corresponding pump curve with the flattest system characteristic curve, since the system characteristic curve increases monotonically with an increasing volumetric flow rate and the pump curve falls monotonically.

A person skilled in the art would be familiar with the determination of the intersection between the system characteristic curve and a pump curve that may be performed, for example, by equating the system characteristic curve to the pump curve. The manufacturer generally sets a large number of pump curves for a centrifugal pump, because they describe the pump characteristic diagram. This is done in an HQ diagram, from which a mathematical equation describing the corresponding pump curve can then be determined, and/or immediately in the form of such a mathematical equation, for example a quadratic power series $H(Q,n)=aQ^2+(n\times b\times Q)+(n^2\times c)$, that assigns a delivery head H to a delivery flow Q and a rotational speed n. The coefficients a, b, and c are set forth by the manufacturer. The volumetric flow rate Q in the intersection arises from the positive solution of the quadratic equation $$0=Q^2+n\times b/(a-k)-Q+n^2\times(c-c_x)/(a-k).$$

The corresponding delivery head in the intersection can be determined by inserting the volumetric flow rate into the equation of the system characteristic curve or into the pump curve.

As an alternative to equating the system characteristic curve to the pump curve, it is also possible to use, for example, the SPLINE method, where the intersection is determined iteratively from a "point cloud" of operating points formed by a stored characteristic diagram with measurement data.

As previously explained, the flattest system characteristic curve maybe set forth absolutely, with respect to a global full-load case, or relatively, with respect to a local full-load case. "Relatively" signifies here that the flattest system characteristic curve is the flattest only within the reference period, but there may possibly be another system characteristic curve outside the reference period that is even flatter and forms absolutely the flattest system characteristic curve. The relatively flattest system characteristic curve is, consequently, valid only for a certain reference period. After this reference period has elapsed, the flattest system characteristic curve is determined for a new reference period.

It is then possible that a prior and new reference period may be consecutive without overlap, or that, as already stated, a moving reference period in which the new reference period overlaps with the prior reference period is used. In the cause of overlap-free reference periods, a reset of the "flattest" system characteristic curve is carried out at the start of a new reference period or at the end of the last reference period. Thus, all of the historical knowledge on the system characteristic curve is determined and must be created anew. The case of a moving reference period is different, with only the oldest system characteristic curve being deleted, because it falls temporally out of the moving reference period; the current system characteristic curve is added to the set of system characteristic curves that are to be taken into consideration for the determining the flattest system characteristic curve.

As already stated, the target point or the lower target point may lie on the minimum pump curve of the centrifugal pump. The minimum pump curve is the pump curve that links all of the operating points of the centrifugal pump with the minimum rotational speed. The minimum rotational speed of a pump is the rotational speed from which the pump is able to actually achieve a delivery head or a volumetric flow rate not equal to zero. Because the system characteristic curves of the hydraulic system all converge at one common point, in the case of a heating system, generally all at the origin of the HQ diagram, the system characteristic curve do not lie very far apart from one another with low volumetric flow rates. For this reason, the target point or the lower target point may be a fixed point on the minimum pump curve, in particular may correspond to an operating point lying on the minimum pump curve of the centrifugal pump when the volumetric flow rate is zero.

However, the lower operating point may also be changed during operation of the centrifugal pump. This may be useful, inter alia, if a check valve is present in the hydraulic system. If there is such a check valve in the system and the opening pressure thereof is greater than the maximum delivery head of the minimum pump curve, a lower target point on the minimum pump curve could cause the check valve to close and never open again if the operating point of the centrifugal pump reaches the lower target point. This is because then the delivery head or the differential pressure built up by the pump at this delivery head is below the opening pressure of the check valve.

In order to avoid this case, the lower target point may be raised to a higher delivery head if the volumetric flow rate is below a predetermined limit value for a certain length of time. This limit value makes it possible to ascertain whether there is a check valve and whether the method has virtually "driven itself dead" due to failure to meet the opening pressure of this check valve. The limit value may be, for example, 1%, in particular 0.1% of the maximum volumetric flow rate on the maximum pump curve. The length of time may be, for example, 2 to 12 hours. Furthermore, the raising the lower target point may be by, in particular 2% to 8% of the maximum delivery head on the maximum pump curve. The raising of the lower target point may also be done a plurality of times during operation of the centrifugal pump.

If the volumetric flow rate is thus, for example, less than 0.1% of the maximum possible volumetric flow rate, the target point for the gain factor with a negative gradient is adapted by raising the last value of the delivery head associated with the lower target point by, for example, 5% of the maximum possible delivery head.

As previously indicated, the gain factor may, according to an advantageous embodiment of the method according to the present invention, be obtained from the slope of a straight gauge line that is illustrated in the HQ diagram as linking the current operating point of the centrifugal pump to the target point. If the gradient is positive, then a straight gauge line to the upper target point is used. If the gradient is negative, then a straight gauge line to the lower target point is used. It should be noted at this point that the basic idea of using a straight gauge line to determine the current optimum gain factor is already implemented if the slope of the corresponding straight gauge line is determined and used as the gain factor solely for a single direction of the state change of the hydraulic system, i.e. solely for positive gradients or solely for negative gradients. It is not necessarily required to use the method according to the present invention for positive and negative gradients. Thus, the method may be used, for example, only for positive gradients or only for negative gradients, so that there is only one single gain factor, and there is a transition to conventional characteristic curve control Δp–c or Δp–v in the case of the respectively opposite sign of the gradient.

However, it is advantageous to use the method according to the present invention both with positive gradients and with negative gradients, such that there are two gain factors, because in this manner it is possible to select optimum gain factors in both change directions and energy-efficient control is possible without the risk of insufficient supply.

The slope of the straight gauge line in the case of a positive gradient may be calculated according to the calculation instruction $$K_{up}=(H_{ZO}-H_{akt})/(Q_{ZO}-Q_{akt})$$

where $K_{up}$ is the gain factor or first gain factor, $H_{ZO}$ is the delivery head associated with the upper target point, $H_{akt}$ is the delivery head associated with the current operating point, $Q_{ZO}$ is the volumetric flow rate associated with the upper target point, and $Q_{akt}$ is the volumetric flow rate associated with the current operating point. The calculation instruction sets forth the ratio of the side length of a right triangle having a hypotenuse that connects the current operating point to the upper target point. Then, the current operating point and the upper target point are each described by the combination of a volumetric flow rate value and a delivery head value.

Correspondingly, the slope of the straight gauge line in the case of a negative gradient may be calculated according to the calculation instruction $$K_{down}=(H_{akt}-H_{ZU})/(Q_{akt}-Q_{ZU})$$

where $K_{down}$ is the gain factor or second gain factor, $H_{ZU}$ is the delivery head associated with the lower target point, $H_{akt}$ is the delivery head associated with the current operating point, $Q_{ZU}$ is the volumetric flow rate associated with the lower target point, and $Q_{akt}$ is the volumetric flow rate associated with the current operating point. The calculation instruction sets forth the ratio of the side length of a right triangle having a hypotenuse that connects the lower target point to the current operating point. Then, the current operating point and the upper target point are each described by the combination of a volumetric flow rate value and a delivery head value. If the lower target point is at the maximum delivery head $H_{max,Min}$ of the minimum pump curve, then, because $Q_{ZU}=0$, the following equation applies:

$$K_{down}=(H_{akt}-H_{max,Min})/Q_{akt}$$

So that the method according to the present invention will run largely robustly and will be largely resilient against errors, in particular any measurement errors, it is advantageous to take limit values into consideration and then to intercept any cases where a determined, in particular calculated, value goes above or below an upper or lower limit value. This is because such values should generally not be admitted, because they may cause the control to be unstable or may lead to an influence that is scarcely sensible in terms of control.

Thus, according to a first limit value consideration, the calculated gain factor may be limited to a maximum value. If greater than the maximum value, the calculated gain factor is consequently set to this maximum value. This preferably corresponds to the slope of a straight line between a lower limit point and an upper limit point, and the lower limit point may lie on or below the minimum pump curve and the upper limit point may lie on or above the maximum pump curve of the centrifugal pump.

Then, the upper limit point may be formed by the intersection between the maximum pump curve and the steepest system characteristic curve of the hydraulic system. The steepest system characteristic curve is equivalent to the flattest system characteristic curve that system characteristic curve at which the coefficient k is greatest or at which there is the highest delivery head in the intersection with the maximum pump curve. Alternatively, the upper limit point may be defined by the maximum delivery head on the maximum pump curve and 10% to 20% of the maximum volumetric flow rate on the maximum pump curve. In this case, the upper limit point lies outside of the maximum pump curve.

Furthermore, according to another limit factor consideration, the calculated gain factor may be limited to a minimum value. This may be, for example, zero. This would not permit any negative gain factors. If negative, the calculated gain factor may be set to the last non-negative value. This means that then the control runs along a Δp–c characteristic curve on which the current operating point lies.

Other features and advantages of the method according to the present invention discussed below with reference to an embodiment. In the drawings, FIG. 1 is a block diagram of the control according to the present invention with a metrological determination of the current operating point;

Figure 1:
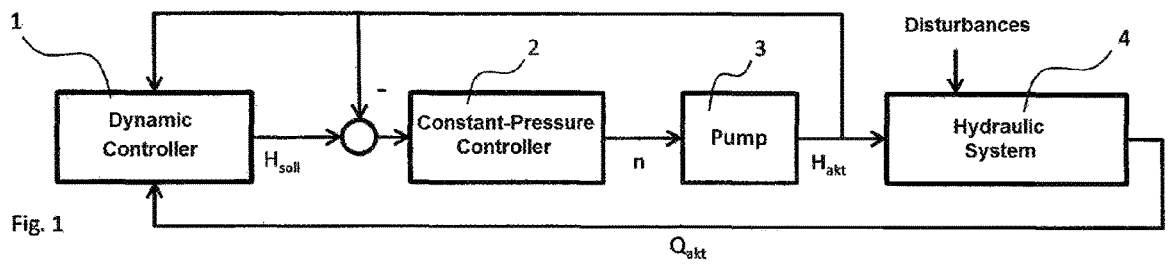

FIG. 1 is a block diagram of a control according to the present invention of an electric motor-driven centrifugal pump 3 in a hydraulic system 4. The hydraulic system 4 may be, for example, a heating system or a cooling system in which a heating or cooling medium is delivered by the centrifugal pump 3 from a central heat source or cooling machine to at least one, preferably, a plurality of self-controlled loads in the circuit. The loads may be, for example, heating elements and/or heating circuits of an underfloor heating system, or cooling zone of an overhead cooling system. Allocated to each one thereof is an actuator, in particular a thermostatic valve, an engine valve, or an electrothermal actuator that controls the volumetric flow rate through the corresponding load. Hereinafter, the actuators described below as valves.

Through the suction side and the pressure side thereof, the centrifugal pump 3 generates a differential pressure Δp, that is proportional to the delivery head $H_{akt}$ and generates a volumetric flow rate $Q_{akt}$ in the hydraulic system 4. Disturbances affect the state of the hydraulic system 4. This is understood to mean, in particular the valves that determine the hydraulic piping resistance of the system.

A controller 2 that specifies a certain rotational speed n in order to achieve a certain set-point delivery head $H_{soll}$ of the centrifugal pump 3 is allocated to the centrifugal pump 3. The rotational speed n is set in a manner known per se, by a frequency inverter (not shown) that controls the centrifugal pump 3. The controller 2 and the pump 3 form a control circuit with which the current set-point delivery head $H_{akt}$ is fed back to the controller input, so as to be taken out from the set-point delivery head $H_{soll}$ and so that the controller 2 corrects the rotational speed n in a manner corresponding to the resulting control deviation. The controller 2 may be configured as a P-, PI-, or PID-controller.

This assembly, which is widely known in the prior art, shall now be complemented by a dynamic controller 1 according to the present invention, which determines a delivery head set-point value $H_{soll}$ and specifies the rotational speed control in accordance with the current operating point $B_{akt}$ and the state of the hydraulic system 1. The current operating point $B_{akt}$ is described here by the current volumetric flow rate $Q_{akt}$ and the current delivery head $H_{akt}$. These quantities are fed to the dynamic controller.

It should be noted that the current operating point and all of the other operating points mentioned below, as well as other points described with reference to the HQ diagram, may also be described by other physical quantities of the pump 3 or of the hydraulic system 4 without departing from the idea of the present invention. Thus, the current operating point and/or the other points may be described, for example, by the rotational speed, the torque, the power consumption, the voltage, and/or the current consumption of the centrifugal pump. This because this involves equivalent manners of description that would be readily familiar to a person skilled in the art. However, because the description on the basis of the known HQ diagram that describes the behavior of the delivery head H via the volumetric flow rate Q, is especially accessible and easy to understand, this means of description is used here.

It should also be noted that insofar as the delivery head is discussed here, the differential pressure of the pump is also meant, because these two quantities can be converted into one another in a closed system such as a heating system, through the proportional relationship $H=\Delta p/(\rho \times g)$, where $\rho$ is the density of the delivered medium and g is gravitational acceleration, i.e. $\rho$ and g are constants.

The current volumetric flow rate $Q_{akt}$ may be measured or calculated. In FIG. 1, the current volumetric flow rate $Q_{akt}$ and the delivery head $H_{akt}$ are measured by a volumetric flow rate sensor and by a differential pressure sensor, respectively, and fed to the dynamic controller 1. In contrast, FIG. 2 differs from FIG. 1 in that the current volumetric flow rate $Q_{akt}$ and the current delivery head $H_{akt}$ are determined computationally, here purely by way of example, through assessment of the current rotational speed n and the current power consumption P of the centrifugal pump 3. Because measurement generally cannot take place over the entire volumetric flow rate range without measurement errors, it is useful to combine measurement at higher volumetric flow rates and calculation at lower volumetric flow rates.

According to another embodiment that is not shown, it is also possible to determine only one of the two quantities of volumetric flow rate $Q_{akt}$ and delivery head $H_{akt}$ or differential pressure metrologically, and determine the other quantity computationally.

A calculation, if performed, may be done on the basis of at least one mathematical model, for example, a model of the electromotive and/or hydraulic part of the pump 3, optionally supplemented by a hydraulic mode of the hydraulic system 4. The electromotive part of the centrifugal pump 3 may be described, for example, by an electrical model and a mechanical model. It should be noted that calculation is also understood to mean estimation. Such an estimation may be based, for example, on an observer formed by a model of the electromotive pump 3 and optionally in combination with a model of the connected hydraulic system 4.

Figure 2:
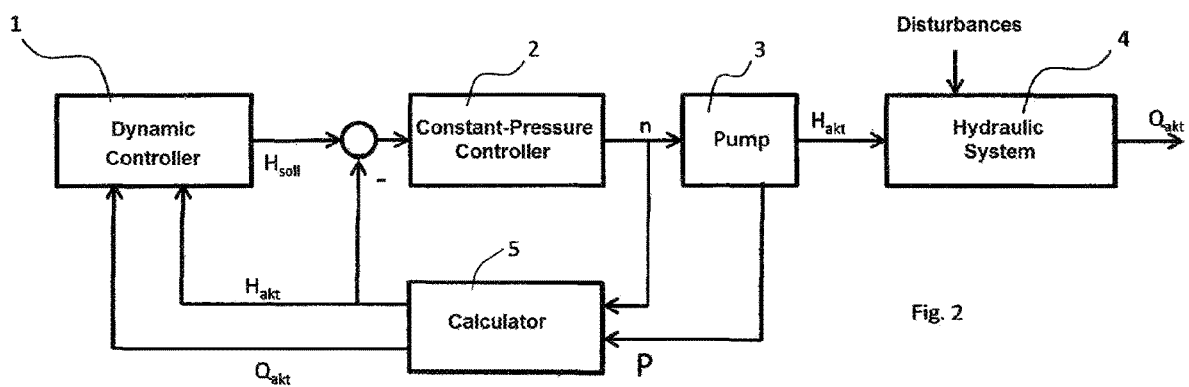
FIG. 2 is a block diagram of the control according to the present invention with a computational determination of the current operating point.

The embodiment according to FIG. 2 is provided with a calculator 5 that calculates the current delivery head $H_{akt}$ and the current volumetric flow rate $Q_{akt}$ from the current rotational speed n and the current power consumption P of the centrifugal pump 3. The values of these quantities are then fed to the dynamic controller 1 that assesses the current volumetric flow rate $Q_{akt}$ and specifies a new set-point delivery head $H_{soll}$ on the basis of the assessment. The method steps carried out by the dynamic controller 1 are shown, inter alia, in FIG. 3 that shows the basic flow of the method. The method proceeds from the current operating point $B_{akt}$ of the centrifugal pump 3 that is provided to the dynamic controller 1, step 20 in FIG. 3. Then, it is first assumed that the method has already been running for some time. When it is being initialized and started, different preparatory steps not shown here for the sake of simplicity take place. Inter alia, parameters and control variables are initialized and different parameters are preset with values. Furthermore, prior to step 20, some measurement values may be collected for possible averaging or smoothing.

The current operating point $B_{akt}$ necessary for carrying out the method is defined by the current volumetric flow rate $Q_{akt}$ and the current delivery head $H_{akt}$, where only the current volumetric flow rate $Q_{akt}$ is of importance at the beginning of the method. Therefore, it would suffice to take only the current volumetric flow rate $Q_{akt}$ into consideration in step 20.

Figure 3:
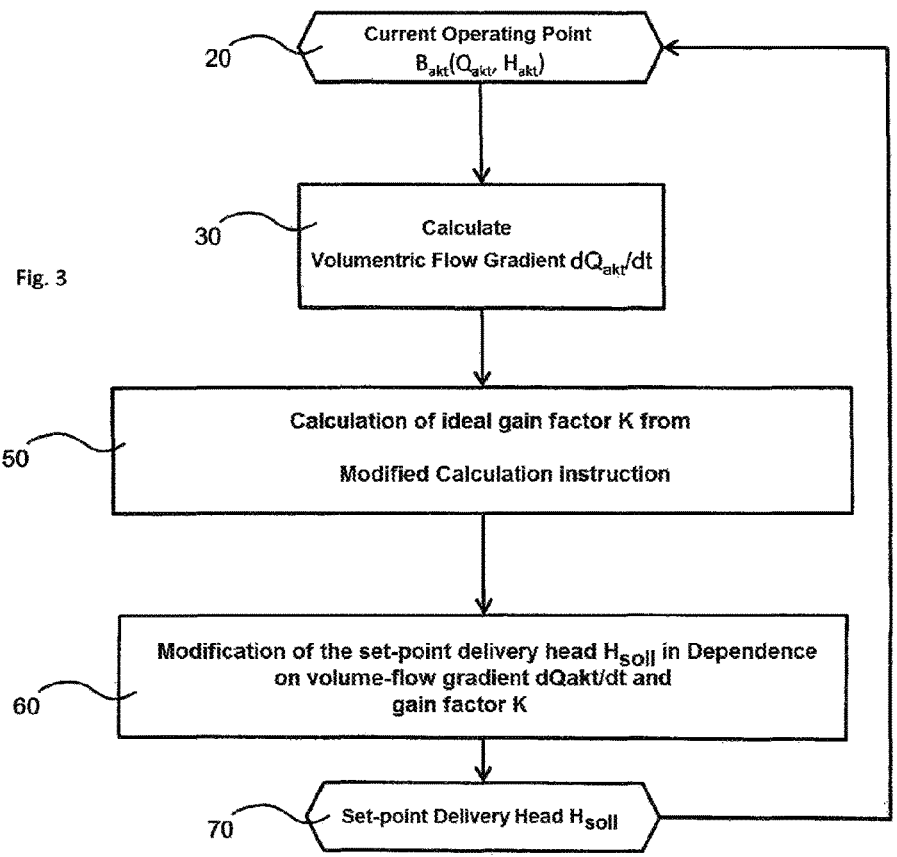
FIG. 3 shows a flow charge of the basic method sequence.

According to the present invention, first a gradient the volumetric flow rate $Q_{akt}$ of the centrifugal pump 3 is determined, step 30 in FIG. 3. The gradient $dQ_{akt}/dt$ is the time derivative of the volumetric flow rate $Q_{akt}$, with the sign thereof setting forth the direction and the value thereof setting forth the magnitude of the current volumetric flow rate change, i.e. a trend. If the gradient $dQ_{akt}/dt$ is positive, of course at least one valve of the hydraulic system 4 opens, as a result of which the volumetric flow rate $Q_{akt}$ increases. If the gradient $dQ_{akt}/dt$ is negative, however, of course at least one valve closes, as a result of which the volumetric flow rate $Q_{akt}$ decreases.

The gradient $dQ_{akt}/dt$ may be calculated in a time-continuous or time-discrete manner. It should be noted here that, in any event, the entire method may be run either in a time-continuous manner or on the basis of discrete sample values, or even partially time-continuously and partially discretely. In the case of a time-discrete calculation, the gradient $dQ_{akt}/dt$ may be determined from the differential quotients of two successive volumetric flow rate values $Q_{akt}(t_1)$, $Q_{akt}(t_2)$, and the differential of these two values is divided by the sampling interval.

The sampling interval may be, for example, between 3 s and 30 s. It preferably corresponds to the interval according to which the method is repeated over and over. This means that at the end of every interval, there is a new delivery head set-point value $H_{soll}$, i.e. the last delivery head set-point value $H_{soll}$ is valid for the duration of one interval and is set by the differential pressure controller 2 in the centrifugal pump 3. In each interval, thus, the delivery head set-point value $H_{soll}$ determined by the dynamic controller 1 is kept constant.

In order to suppress measuring noise, the gradient $dQ_{akt}/dt$ may be smoothed. For example, the gradient $dQ_{akt}/dt$ may be calculated from a number of slidingly determined volumetric flow rate values $Q_{akt}$. Alternatively or additionally, the calculated gradient $dQ_{akt}/dt$ may itself be determined slidingly over a certain number of values. The number may be, ideally, 4 to 16 values each. Sliding average means that an average value is determined via the group formed by the certain number of values and the oldest value of each current group is replaced by a new value once the new value is available. It can be readily understood that a sufficient number of values must be available in order for sliding averaging to be possible. Therefore, a sufficient number of measurement values must be connected at the beginning of the method. In this respect, it may be provided that step 30 is then first run only if there are sufficiently many values available.

In step 50, at least one ideal gain factor K that is required in the following step 60 for adapting the set-point delivery head $H_{soll}$ is calculated. The adaptation is done in accordance with the calculated volumetric flow rate gradient $dQ_{akt}/dt$ and the calculated gain factor K. At the end of the method, then, the new set-point delivery head $H_{soll}$ is available, see step 70. The method is then repeated, the repetition being cyclical, here every 30 seconds by way of example. There is then a new set-point delivery head $H_{soll}$ that is again ascertained on the basis of the now new current operating point $B_{akt}$.

Different embodiments are possible for the method sequence. The volumetric flow rate gradient $dQ_{akt}/dt$ must be calculated in every case for the adaptation of the set-point delivery head $H_{soll}$ in step 60. It need not necessarily be used in any of the previous steps. For this reason, in one embodiment, the sequence of the steps 30 and 50 may be interchangeable, or the steps 30 and 50 may be implemented simultaneously.

Figure 4:
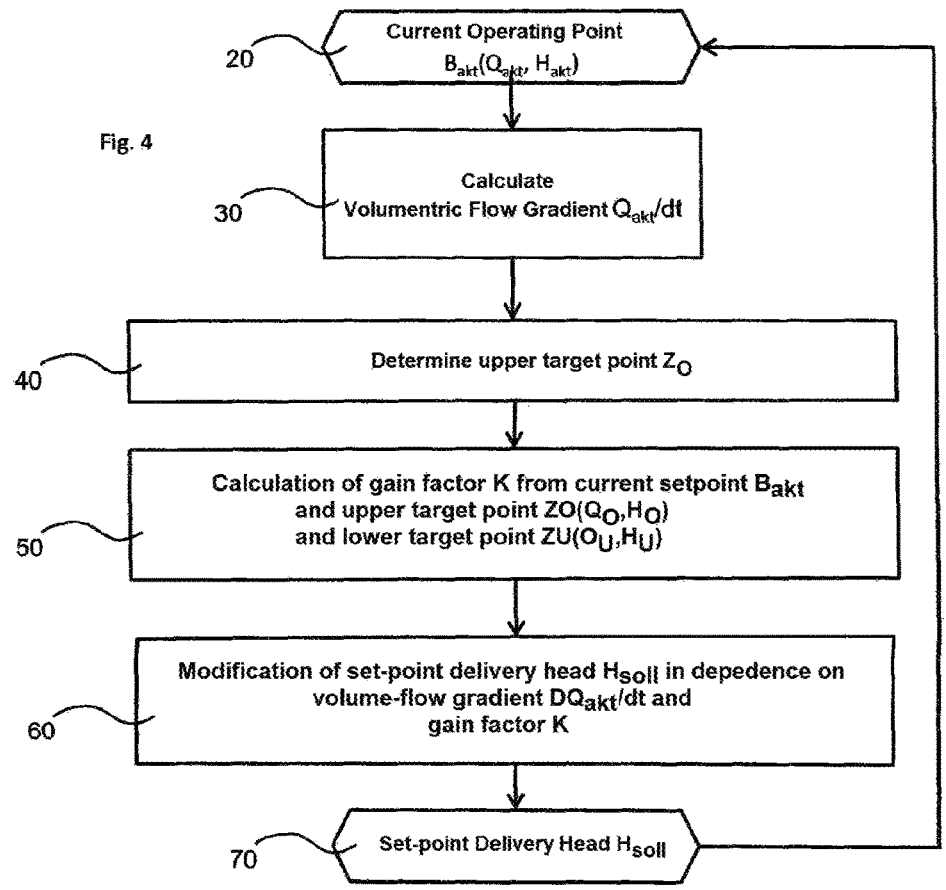
FIG. 4 shows an embodiment with calculation of the upper target point.
Figure 5:
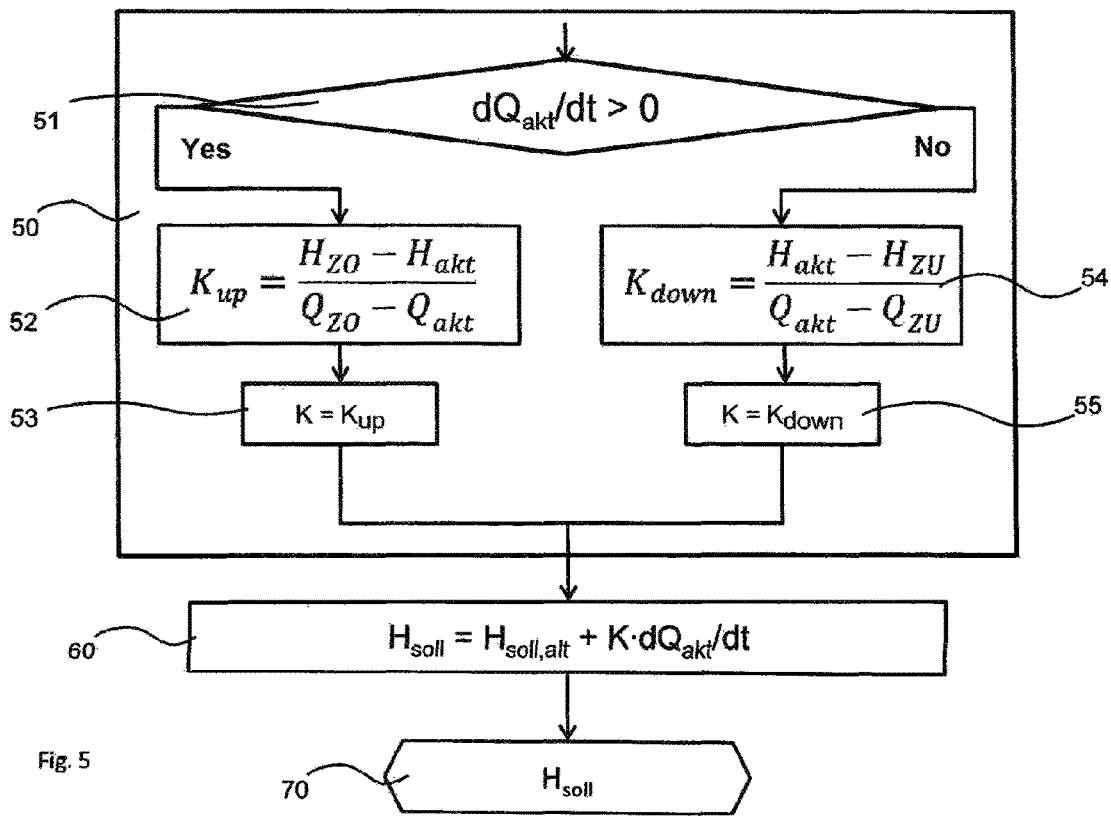
FIG. 5 shows a detail view of the determination of the ideal gain factor.

FIGS. 4 and 5 illustrate an embodiment of the method in step 50 that embodies the calculation of the gain factor K. Therein, the calculation is made from the current operating point $B_{akt}$ and an upper target point $Z_O(Q_O, H_O)$ or from the current operating point $B_{akt}$ and a lower target point $Z_U(Q_U, H_U)$.

The upper target point $Z_O$ lies above the current operating point $B_{akt}$ in the HQ diagram. The upper target point is defined by a volumetric flow rate $Q_{ZO}$ greater than the current volumetric flow rate $Q_{akt}$, preferably but not necessarily also by a delivery head $H_{ZO}$ greater than the current delivery head $H_{akt}$.

The lower target point $Z_U$ lies below the current operating point $B_{akt}$. The lower target point is defined by a volumetric flow rate $Q_{ZU}$ lesser than the current volumetric flow rate $Q_{akt}$, preferably but not necessarily also by a delivery head $H_{ZU}$ greater than the current delivery head $H_{akt}$. Thus, the current operating point $B_{akt}$ always lies between the upper and lower target points $Z_O$, $Z_U$.

The lower target point $Z_U(Q_U, H_U)$ is specified first and therefore need not be determined at first. It is required in order to calculate an ideal gain factor $K=K_{down}$ in the case of a negative gradient $dQ_{akt}/dt$. This is checked in step 51 in FIG. 5, where the query there of $dQ_{akt}/dt>0$ would accordingly lead to the no-branch in this case. The case-specific gain factor $K=K_{down}$ is then determined in step 54 from the calculation instruction $$K_{down}=(H_{akt}-H_{ZU})/(Q_{akt}-Q_{ZU})$$

This describes the slope of a straight gauge line between the current operating point $B_{akt}$ that is characterized by the current volumetric flow rate $Q_{akt}$ and the current delivery head $H_{akt}$, and the lower target point $Z_U$ that is characterized by a corresponding volumetric flow rate $Q_{ZU}$ associated with the lower target point and by a corresponding delivery head $H_{ZU}$. In step 55, this case-specific gain factor $K_{down}$ is set as a general gain factor K that is used for calculating the set-point delivery head $H_{soll}$ in step 60. Steps 54 and 55 may also be combined, however, and the general gain factor K is immediately calculated then with the calculation instruction.

Thus, if the gradient $dQ_{akt}/dt$ is negative in step 51, then no other calculation needs to be performed in step 50. The gradient calculation in step 30 in FIG. 4 could then immediately transition into step 50, and step 50 into step 60, as is shown also in FIG. 3.

If, however, the gradient $dQ_{akt}/dt$ is positive, then a second case-specific ideal gain factor $K=K_{up}$ is calculated according to the present invention, see step 52. The calculation instruction used therefor reads $$K_{up}=(H_{ZO}-H_{akt})/(Q_{ZO}-Q_{akt})$$

and describes the slope of a straight gauge line between the current operating point $B_{akt}$ that is characterized by the current volumetric flow rate $Q_{akt}$ and the current delivery head $H_{akt}$, and the upper target point $Z_O$ that is characterized by a corresponding volumetric flow rate $Q_{ZO}$ associated with the upper target point and by a corresponding delivery head $H_{ZO}$. In step 53, this case-specific gain factor $K_{up}$ is set as a general gain factor K that is used for calculating the set-point delivery head $H_{soll}$ in step 60. Steps 52 and 53 may also be combined, however, and the general gain factor K is immediately calculated then with the calculation instruction.

Consequently, the upper target point $Z_O(Q_O, H_O)$ is required for the second case-specific gain factor $K_{up}$. It must therefore be known before the second case-specific gain factor $K_{up}$ is calculated. The determination thereof takes place in step 40, i.e. at least before step 52. However, different positions may be useful for the actual implementation of step 40.

FIG. 4 shows an embodiment where the determination of the upper target point $Z_O(Q_O, H_O)$ takes place outside of step 50. This is advantageous in that the case distinction in step 51 may be forgone in step 50. Then, both case-specific gain factors $K_{up}$, $K_{down}$ are calculated in step 50. Only when the set-point delivery head $H_{soll}$ is adapted does the query (step 51) of the sign of the gradient $dQ_{akt}/dt$ take place, and therewith the decision of which of the two ideal gain factors $K_{up}$, $K_{down}$ should be used. In this case, the determination of the gradient $dQ_{akt}/dt$ may take place in step 30, in contrast to FIG. 4, behind step 40 or step 50. If the case distinction in step 51 takes place within step 50, however, then the calculation of the gradient $dQ_{akt}/dt$ necessarily must come before.

Figure 6:
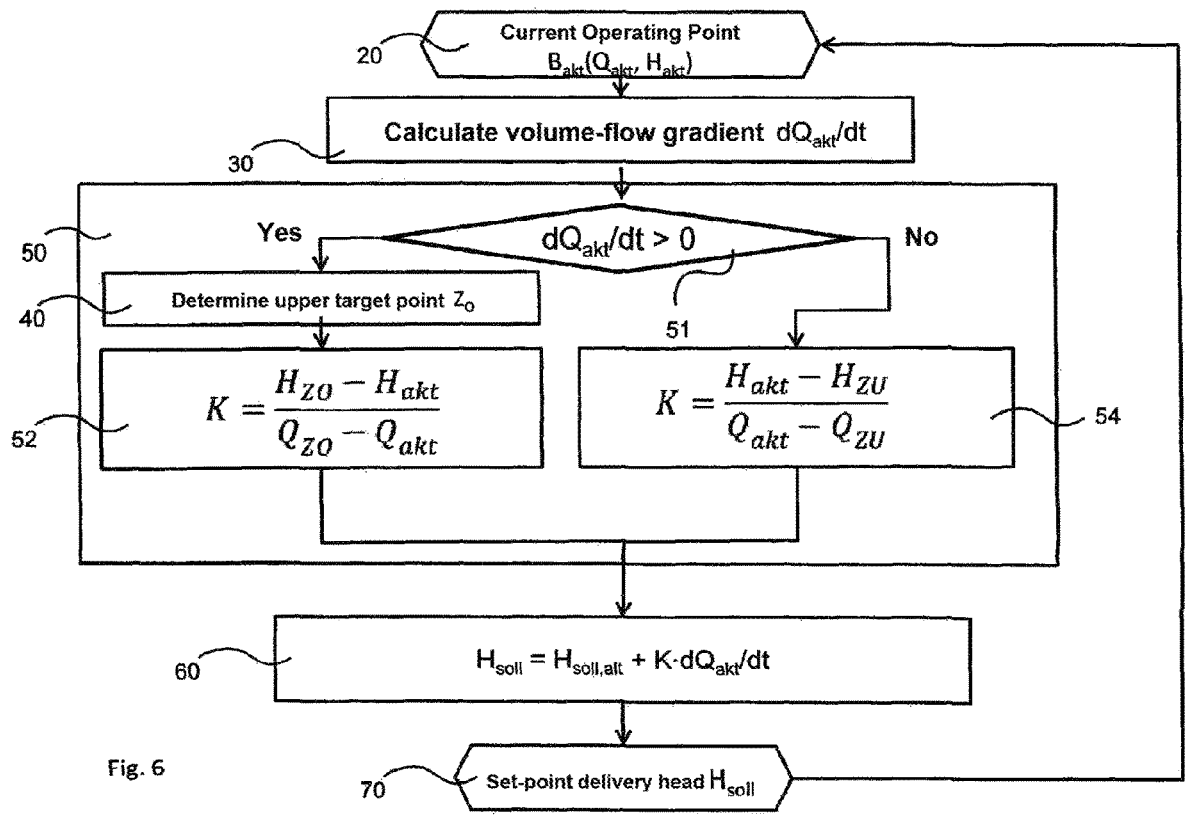
FIG. 6 shows a second embodiment with calculation of the upper target point and a detail view of the determination of the ideal gain factor.

FIG. 6 shows an alternative embodiment to those of FIGS. 4 and 5. It differs from the variant in FIGS. 4 and 5 in that the determination of the upper target point $Z_O(Q_O,H_O)$ comes immediately before the calculation of the second case-specific gain factor $K_{up}$, i.e. here only after it has been ascertained that the gradient $dQ_{akt}/dt$ is positive. For this reason, step 40 in FIG. 6 follows after the case distinction in step 51 in the yes-branch. The upper target point is thus only calculated or recalculated if also actually needed. It is, however, not calculated if the gradient $dQ_{akt}/dt$ in the current cycle is negative.

Moreover, FIG. 6 summarizes the steps 52, 53, 54, and 55, respectively. Thus, there is namely no distinction made between two different gain factors, even though two different gain factors K are calculated in the flow chart in FIG. 6. Finally, in each cycle, only one single gain factor K, which is then used for calculating the new set-point delivery head, is calculated. Following the calculation of one of the gain factors, a new current set-point delivery head $H_{soll}$ is then determined in step 60. This is done in accordance with the gradient $dQ_{akt}/dt$, here in accordance with the magnitude and sign of the gradient $dQ_{akt}/dt$, and the set-point delivery head $H_{soll}$ is calculated from a mathematical operation of the gradient $dQ_{akt}/dt$, having been weighted with the calculated gain factor K, and the last specified set-point delivery head $H_{soll,alt}$.

The mathematical operation achieves a positive feedback between the volumetric flow rate change $dQ_{akt}/dt$ and the set-point delivery head $H_{soll}$. Then, the set-point delivery head $H_{soll}$ is increased if the volumetric flow rate Q is rising, i.e. the gradient $dQ_{akt}/dt$ is positive, and the set-point delivery head $H_{soll}$ is reduced if the volumetric flow rate Q is decreasing, i.e. the gradient $dQ_{akt}/dt$ is negative. The positive feedback between the delivery flow change $dQ_{akt}/dt$ and the delivery head H ensures a rapid response of the set-point delivery head $H_{soll}$ to the system-induced change in the delivered volumetric flow rate $Q_{akt}$, for example if the thermostatic valves in the heating system 4 open or close quickly.

This positive feedback is achieved in such a manner that a positive feedback value M, which is positive if the gradient $dQ_{akt}/dt$ is positive and is negative if the $dQ_{akt}/dt$ is negative, is added to the last specified set-point delivery head $H_{soll,alt}$. The new set-point delivery head $H_{soll}$ consequently arises from the old value $H_{soll,alt}$ plus the positive feedback value M according to the equation $$H_{soll}=H_{soll,alt}+M.$$

In terms of control, this is an integrator. The positive feedback value M is calculated dynamically during operation of the centrifugal pump 3. It corresponds to the volumetric flow rate gradient $dQ_{akt}/dt$ having been weighted with a gain factor K. The gain factor K is, consequently, a positive variable in this case. In the present example, thus, the mathematical operation is the addition of the gradient $dQ_{akt}/dt$, having been weighted with the gain factor K, to the last specified set-point delivery head $H_{soll,alt}$.

Suitably, the positive feedback value M may additionally include a normalization factor with which the product of the gain factor K and the gradient $dQ_{akt}/dt$ is multiplied in order to achieve normalization of the positive feedback value W and an adaptation of the dimension thereof to the dimension of the set-point delivery head $H_{soll}$. This normalization factor may be, for example, the sampling interval T. Thus, the equation will be $$M=K \times dQ/dt \times T.$$

With the calculation of the new set-point delivery head $H_{soll}$ in step 60, the main part of the method according to the present invention is finished. The new set-point delivery head $H_{soll}$ is provided by the dynamic controller 1 in system 70 to the constant pressure controller 2 that then adjusts this via the rotational speed n.

It is therefore proposed, with the method according to the present invention, to determine the current operating point $B_{akt}$ of the centrifugal pump 3 and calculate the current ideal gain factor K from a functional relationship between the current operating point $B_{akt}$ and a target point $Z_O$, $Z_U$ that lies either above or below the current operating point. This is described below with reference to the HQ diagram in FIG. 7.

The HQ diagram shows the pump characteristic diagram that is delimited from below by the minimum pump curve 10 and from above by the maximum pump curve. The minimum pump curve 10 describes the dependence of the delivery H on the volumetric flow rate at a minimum rotational speed $n_{min}$ of the centrifugal pump, and the maximum pump curve 11 describes the dependence of the delivery head H on the volumetric flow rate at a maximum rotational speed $n_{max}$ of the centrifugal pump. The rotational speed n of the centrifugal pump 3 is consequently constant along a pump curve 10, 11 The operating points of the centrifugal pump 3 lie between the minimum pump curve and the maximum pump curve. It should be noted at this point that with the pump 3, a power limitation may be implemented that makes it possible to specify a lower maximum rotational speed that deviates from the maximum pump curve 11 in the range of the greatest power during operation.

The current operating point $B_{akt}$ of the centrifugal pump 3 is described here by the current volumetric flow rate $Q_{akt}$ and the current delivery head $H_{akt}$. It is on a current pump curve that, by way of example, is located between the minimum and maximum pump curves 10, 11 in FIG. 7. At the same time, the current operating point $B_{akt}$ is on a system characteristic curve 14 that describes the current state of the hydraulic system. This system characteristic curve 14, also called a piping parabola, is described here by way of example by a parabola of the form $H_a=k \times Q^2$, where k is the slope of the parabola. A check valve is not taken into consideration here, for the sake of simplicity. The slope is, at the same time, a measure of the hydraulic resistance of the system 4. The farther the valves close and/or the more valves there are that close, the greater k will be, i.e. the steeper the slope of the system characteristic curve will be. The farther the valves open and/or the more valves there are that open, the smaller k will be, i.e. the flatter the slope of the system characteristic curve will be.

The pump curves 10, 11 make it clear that the centrifugal pump 3 can, at any rotational speed n, achieve a maximum delivery head and a maximum volumetric flow rate on the maximum pump curve associated with the rotational speed. This depends on the location of the system characteristic curve 14. The theoretically maximum delivery head on the maximum pump curve 11 is designated with $H_{max,Max}$, and the theoretically maximum volumetric flow rate on the maximum pump curve 11 is designated with $Q_{max,Max}$. Correspondingly, the theoretically maximum delivery head on the minimum pump curve 11 is designated with $H_{max,Min}$, and the theoretically maximum volumetric flow rate on the minimum pump curve 11 is designated with $Q_{max,Min}$.

Figure 7:
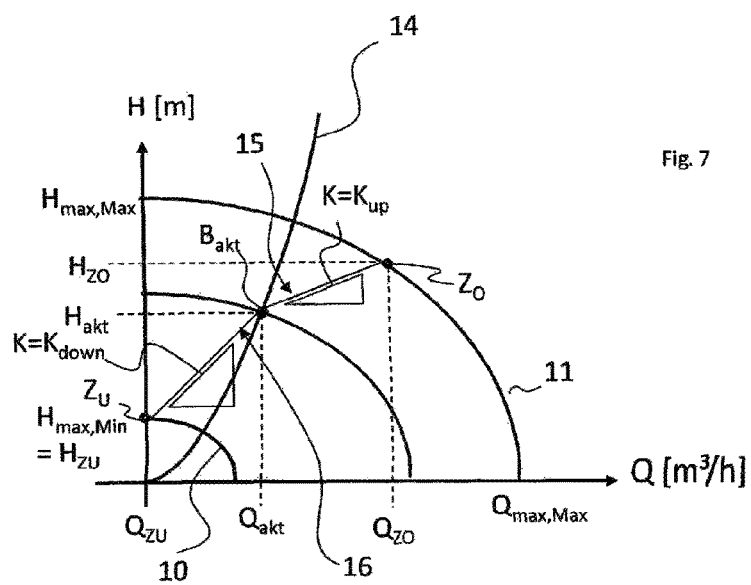
FIG. 7 is an HQ diagram for depicting the method.

In the embodiment according to FIG. 7, the lower target point $Z_U$ is fixed, at least at the start of the method. There may be adaptation, however, if a check valve is present and recognized in the hydraulic system. The lower target point $Z_U$ is placed in FIG. 7 on the operating point of the maximum delivery head $H_{max,Min}$ on the minimum pump curve 10. At this point, the volumetric flow rate is zero.

As indicated by the embodiment in FIG. 7, an upper target point $Z_O$ that lies above the current operating point $B_{akt}$ is defined. It is characterized by a delivery head $H_{ZO}$ and a volumetric flow rate $Q_{ZO}$. The upper target point $Z_O$ may also be fixed, for example, may lie in the operating point of maximum power of the centrifugal pump 3. For better dynamic adaptation of the gain factor K, however, it is advantageous to keep the upper target point $Z_O$ variable.

In FIG. 7, the upper target point is selected so as to lie on the maximum pump curve 11. This, however, need not necessarily be the case. If, for example, the centrifugal pump 3 is oversized for the hydraulic system 4, the centrifugal pump will never reach an operating point on the maximum pump curve 11. In this case, the upper target point $Z_O$ may lie on the pump curve that belongs to the highest rotational speed n that the centrifugal pump 3 is driven during operation in the hydraulic system 4. This highest rotational speed may be monitored, recorded, and repeatedly corrected if driven still higher than the currently recorded highest rotational speed. If the rotational speed is corrected upward, preferably the upper target point $Z_O$ can also be corrected upward, so as to remain lying on the pump curve associated with the highest rotational speed.

Another case, where the upper target point need not lie on the maximum pump curve 11, exists then when a power limitation of the pump 3 is acting. This is because in this case the rotational speed is reduced relative to the maximum rotational speed on the maximum pump curve 11, in order not to exceed a certain power limit. This causes the maximum pump curve to be flattened and form approximately a straight line in the range exceeding the power limit. The upper target point then lies on a curve that is described outside of the power limit by the maximum pump curve and inside of the power limit by this straight line.

FIG. 7 assumes, however, that the centrifugal pump 3 has been adapted to the hydraulic system in terms of power, i.e. is not oversized and also does not enact a power limitation. The pump characteristic diagram is limited therefore by the maximum pump curve, so that the upper target point lies usefully on this maximum pump curve.

Ideally, the upper target point is calculated from the past states of the hydraulic system 4, as described below. This may be done in addition to or as an alternative to the taking into consideration of the highest rotational speed.

As shown in steps 52 and 54 of FIGS. 5 and 6, the gain factor K is determined from the slope of a straight line, starting from the current operating point. As illustrated in FIG. 7, a straight gauge line 15, 16 between the current operating point $B_{akt}$ and one of the target points $Z_O$, $Z_U$ is used, and the slope of this straight gauge line 15, 16 is used as the gain factor K.

The basic idea of the present invention is thus to use a reference point $Z_O$ or $Z_U$ and set same in relation to the current operating point $B_{akt}$. This reference point $Z_O$, $Z_U$ is targeted in a certain manner, which can be seen in the HQ diagram starting from the current operating point $B_{akt}$, in the form of the straight lines 15, 16 linking the current one and the reference point $Z_O$, $Z_U$. Therefore, the reference points $Z_O$, $Z_U$ are also referred to as target points. The slope, then, of one of the straight gauge lines 15, 16 is calculated and used as the gain factor K.

Already, due to the use of the current operating point $B_{akt}$ to calculate the gain factor K, the calculation instruction will always be a different one, and changes dynamically during operation of the centrifugal pump 3. As illustrated in the HQ diagram, the slope of the straight gauge line 15, 16, and, therewith, of the gain factor K, already changes as a result of the change of the current operating point $B_{akt}$. Additionally, the slope changes if the target point is also changed. This achieves optimal adaptation of the pump 3 to the load state of the hydraulic system 4 on the one hand, and broadly prevents positive feedback-related oscillations in the hydraulic system 4 on the other hand.

If the gradient $dQ_{akt}/dt$ is positive, a straight gauge line 15 from the current operating point $B_{akt}$ to the upper operating point $Z_O$ is used. The slope of this first straight gauge line 15 results, then, from the ratio of the lengths of the two sides of a right triangle placed against the first straight gauge line. This slope is selected as the gain factor K or first gain factor $K_{up}$, so that the following equation applies $$K=K_{up}=(H_{ZO}-H_{akt})/(Q_{ZO}-Q_{akt})$$

where K is the gain factor in general, $K_{up}$ is the first gain factor for an increasing volumetric flow rate, $H_{ZO}$ is the delivery head associated with the upper target point $Z_O$, $H_{akt}$ is the delivery head associated with the current operating point $B_{akt}$, $Q_{ZO}$ is the volumetric flow rate associated with the upper target point $Z_O$, and $Q_{akt}$ is the volumetric flow rate associated with the current operating point $B_{akt}$.

If the gradient is negative, a straight gauge line 16 from the current operating point $B_{akt}$ to the lower operating point $Z_U$ is used. The slope of this second straight gauge line 16 results, then, from the ratio of the lengths of the two sides of a right triangle placed against the second straight gauge line 16. This slope is selected as the new gain factor K or first gain factor $K_{down}$ so that the following equation applies $$K=K_{down}=(H_{akt}-H_{ZU})/(Q_{akt}-Q_{ZU})$$

where K is the gain factor in general, $K_{down}$ is the second gain factor, $H_{ZU}$ is the delivery head associated with the lower operating point $B_{akt}$, $H_{akt}$ is the delivery head associated with the current operating point $B_{akt}$, $Q_{ZU}$ is the volumetric flow rate associated with the lower operating point, and $Q_{akt}$ is the delivery flow associated with the current operating point. Because, in the embodiment in FIG. 7, the lower target point $Z_U$ lies on the minimum pump curve 10 with a volumetric flow rate of zero and maximum delivery head $H_{max,Min}$, the following equation applies:

$$K=K_{down}=(H_{akt}-H_{min,Max})/Q_{akt}$$

The use of different gain factors $K_{up}$, $K_{down}$ for increasing and decreasing volumetric flow rates Q is advantageous in that there can be a response with different speeds to the different state changes in the system, i.e. to opening or closing valves. If, in contrast, the two gain factors $K_{up}$, $K_{down}$ are the same, then the first and second straight gauge lines 15, 16 form a common, kink-free straight line.

The centrifugal pump 3 runs mostly in partial-load operation, i.e. in a system state with partially opened and partially closed valves, or with some opened valves and some closed valves. For this reason, the selection of the lower target point $Z_U$ on the minimum pump curve 10 and the upper target point $Z_O$ on the maximum pump curve 11 causes the gain factor $K_{up}$ to be greater with increasing volumetric flow rates Q than with decreasing volumetric flow rates Q. Thus, for example, in the case of a heating system, there can be a quickly response to a heating request where valves open, and the volumetric flow rate required for the heat transport can be made available. A slow response, meanwhile, would result in higher latencies until the heat arrives at the load, so that the corresponding room is heated more slowly and the comfort of the user is affected.

In contrast, in the reverse case of closing valves, a slow response may suffice and even be advantageous. In this case, the centrifugal pump 3 would indeed run energy-inefficiently for some time, but this would not lead to adversely affected comfort for the user. Rather, the pump 3 can slowly find an operating state in which it consumes less energy and yet still provides the necessary thermal energy, and the pump is in a sort of "standby" state on the way to quickly changing back to higher volumetric flow rates, because it has not yet achieved the optimal-energy operation that may possibly be far away from the previous operating point.

Figure 8:
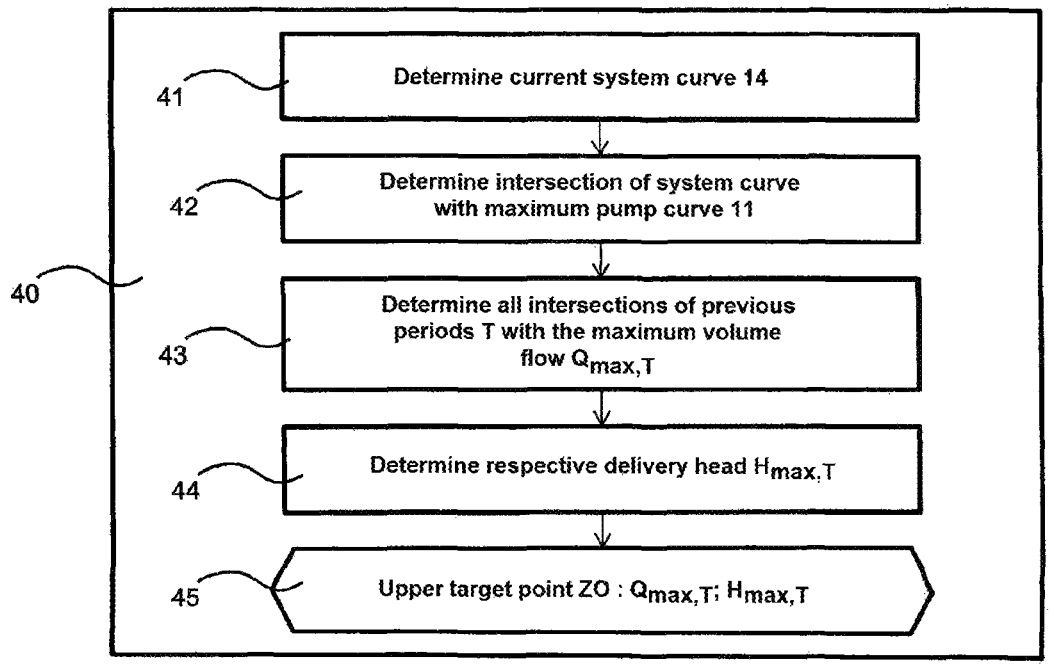
FIG. 8 is a flow chart for determining the upper target point.
Figure 9:
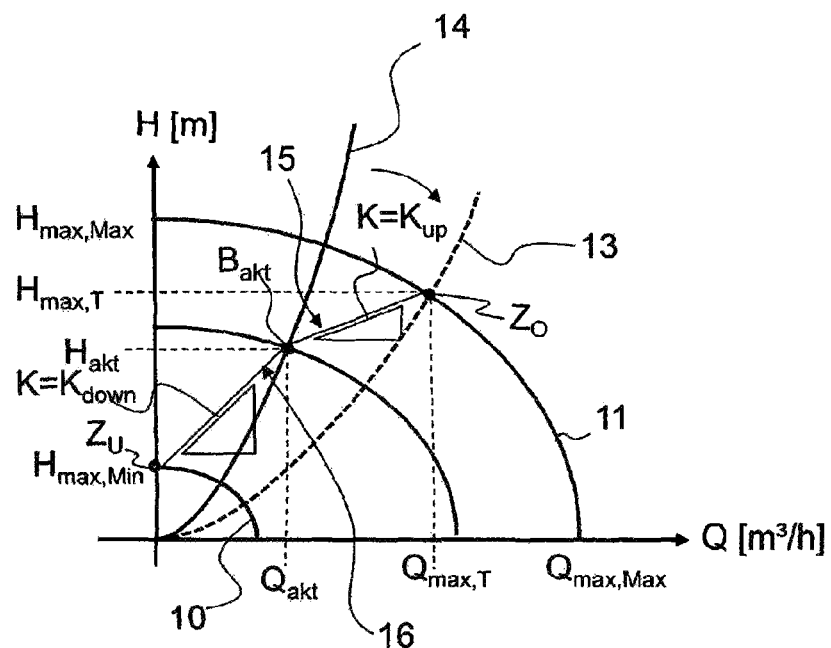
FIG. 9 is an HQ diagram for depicting the upper target point on the flattest system characteristic curve.

FIG. 8 represents method steps of an embodiment for ascertaining a suitable upper target point $Z_O$. In this variant, the upper target point $Z_O$ is calculated from past states of the hydraulic system 4. It is then the objective for the dynamic controller 1 to set the upper target point $Z_O$ to where the pump 3 is operated with full load. In particular it should be set to where the pump 3 delivers the greatest volumetric flow rate Q at the highest rotational speed n. This is done in the embodiment according to FIG. 8 by selection of a target point $Z_O$ on the maximum pump curve 11 by the dynamic controller 1. This is done by determining the flattest system characteristic curve 13 and setting the intersection thereof with the maximum pump curve 11 as the upper target point $Z_O$. This is illustrated in FIG. 9.

For this purpose, the current system characteristic curve 14 is determined in a first step 41. The system characteristic curve mathematically describes the functional relationship between the delivery head H and volumetric flow rate Q of the piping network forming the hydraulic system 4, inclusive of the connected loads and the controlling adjusting means thereof. This relationship is, at its simplest, quadratic, according to $H_a(Q)=k \times Q^2+c_x$, so that the system characteristic curve may also be considered a piping parabola of which the slope is defined by the value of the parameter k. The parameter $c_x$ sets forth, in terms of delivery head value, the differential pressure that must be overcome in order to open a check valve. Provided that the hydraulic system 4 does not have a check valve, $c_x$ can be set to zero. The current system characteristic curve 14 is determined by determining the parameter(s) k, $c_x$ of the piping parabola. The intersection between the system characteristic curve 14 and the maximum pump curve 11 is then determined in step 42. The intersection may be found by equating the mathematical equations for the system characteristic curve 14 and the maximum pump curve 11.

The calculation of the current system characteristic curve 14 is repeated with every cycle of the method, so that it is known at every point in time that past system curves existed. Every intersection with the maximum pump curve 11 is characterized by a certain volumetric flow rate and a certain delivery head. The cyclic determination of the system characteristic curve 14 and the intersection consequently produces a set of volumetric flow rates. This is followed by ascertainment of which of all of the specific intersections is the one with the greatest volumetric flow rate $Q_{max,T}$. Consequently, the greatest volumetric flow rate $Q_{max,T}$ is determined from the set of volumetric flow rates. This greatest volumetric flow rate $Q_{max,T}$ lies on the system characteristic curve 13 that is the flattest. Should a new volumetric flow rate value of a new intersection that is even greater than all of the previous values be added to the set, then this new value is set as the greatest volumetric flow rate value $Q_{max,T}$, because an even flatter system characteristic curve has obviously occurred in the hydraulic system 4.

It should be noted that a set of volumetric flow rate values of the intersections need not necessarily be formed. Rather, the greatest volumetric flow rate may be stored and replaced again and again by an even higher volumetric flow rate, as soon as one is detected. At the start of the calculation, then, the first determined volumetric flow rate is simply set as the greatest volumetric flow rate.

If, however, the formation of the set of volumetric flow rates is used, then it is advisable not to allow this set to be infinitely large, but rather to limit same to a reference period T. Due to the periodic recurrence of certain load states occurring in a heating system as a result of the user habits, it is useful to set the reference period to 24 hours, because the heat curve repeats daily due to the user habits. This applies at least for the days of the week. This is because the characteristic load states of the hydraulic system, for example, heating up in the morning and evening when one is at home or enters or leaves the office, or the reduced temperature at night, repeat daily. A shorter reference period T may also be used, however, for example, 12 hours, in order to determine a highest volumetric flow rate $Q_{max,T}$ for day operation and night operation, respectively, or a multiple of 24 hours in order to determine a highest volumetric flow rate $Q_{max,T}$ over two or more days.

The reference period T may preferably be used as a sliding time window. This means that the highest volumetric flow rate of the set gradually becomes older and, if no new highest volumetric flow rate is determined, is dropped from the set after an age corresponding to the duration of the reference period T, with the second-highest volumetric flow rate of the set then becoming the highest volumetric flow rate. The sliding time window thus has a regenerative effect.

As an alternative to the sliding time window, the set of volumetric flow rates or, in any case, the highest determined volumetric flow rate may be deleted and re-formed after a certain reference period T. FIG. 9 shows that the current system characteristic curve 14 is steeper than the flattest system characteristic curve 13 (dashed line) that has occurred in the system since the beginning of the current reference period T. If the valves of the loads open, the current system characteristic curve 14 moves in the direction of the flattest system characteristic curve 13.

Once the greatest volumetric flow rate $Q_{max,T}$ is known, the related delivery head $H_{max,T}$ can be determined, step 44, for example, by entering the greatest volumetric flow rate $Q_{max,T}$ into the equation for the system characteristic curve 14 or the equation for the maximum pump curve. The two determined values $Q_{max,T}$ and $H_{max,T}$ are then set as the upper target point $Z_O$, step 45, which is then used for the other method steps. These values produce, for the mathematical calculation instruction in step 52, the equation $$K=K_{down}=(H_{max,T}-H_{akt})/(Q_{max,T}-Q_{akt}).$$

As an alternative to repeated calculation of the system characteristic curve 14 and the intersection and the subsequent determination of the highest volumetric flow rate $Q_{max,T}$, the slope k of the respectively determined current system characteristic curve 14 may be used to determine the flattest system characteristic curve. This is because the flattest system characteristic curve is the one with the smallest parameter k. The determination of the current system characteristic curve 14 in step 41 from FIG. 8 may therefore be followed by a step in which the flattest system characteristic curve is determined directly. This may, analogously to the approach above, be done either by determining the slope k of each determined system characteristic curve, collecting the slopes into a set of slopes, and then determining the smallest slope $k_{min}$ from this set, or by checking at each determination of the slope k for whether this is smaller than a previously ascertained smallest slope $k_{min}$. In the mentioned second case, the slope of the first determined system characteristic curve should be stored as the smallest slope $k_{min}$ only at the beginning of the method.

If the smallest slope $k_{min}$ is known, the flattest system characteristic curve is also available. Then, in a subsequent step, the intersection of the flattest system characteristic curve with the maximum pump curve or the volumetric flow rate $Q_{max,T}$ defining this intersection and the defining delivery head $H_{max,T}$ may be determined and used as the upper target point.

With this alternative variant, thus, the intersection with the maximum pump curve 11 and, therefrom, the flattest system characteristic curve are not determined at every cycle; rather, first the system characteristic curve is determined, and then the intersection therefrom.

With the described alternative variant, too, the smallest slope $k_{min}$ may be determined for a certain reference period T, i.e. after the end of the reference period, the smallest determined slope $k_{min}$ is deleted again and re-determined. The same properties as previously discussed apply to the reference period T.

The method described is illustrated by FIG. 9. The pursued ideal gain factor K is selected according to the present invention so as to be equal in amount to the slope of the first straight gauge line 15 for a positive gradient $dQ_{akt}/dt$ and equal to the slope of the second straight gauge line 16 for a negative gradient $dQ_{akt}/dt$. The gain factor K is thus determined according to a different mathematical rule when there is a volumetric flow rate increase, i.e. a positive gradient $dQ_{akt}/dt>0$ (step 52) than when there is a volumetric flow rate decrease, i.e. a negative gradient $dQ_{akt}/dt<0$ (step 54). In summary, the following calculation instruction applies therefor, with consideration given to the upper and lower target points $Z_O$, $Z_U$ shown in FIG. 9:

$$K = \begin{cases} K_{up} = (H_{max,T} - H_{akt})/(Q_{max,T} - Q_{akt}) & \text{for } dQ/dt > 0 \\ K_{down} = H_{akt} - H_{max,Min})/Q_{akt} & \text{for } dQ/dt < 0 \end{cases}$$

For the sake of mathematical completeness, it should be noted that the gain factor K for $dQ_{akt}/dt<0$ may be set to equal zero, because in this case there is no need to adapt the set-point delivery head $H_{soll}$.

As a security measure, different limit value considerations may be carried out to make the method especially robust and more failsafe. They are illustrated in FIGS. 10 and 11.

Figure 10:
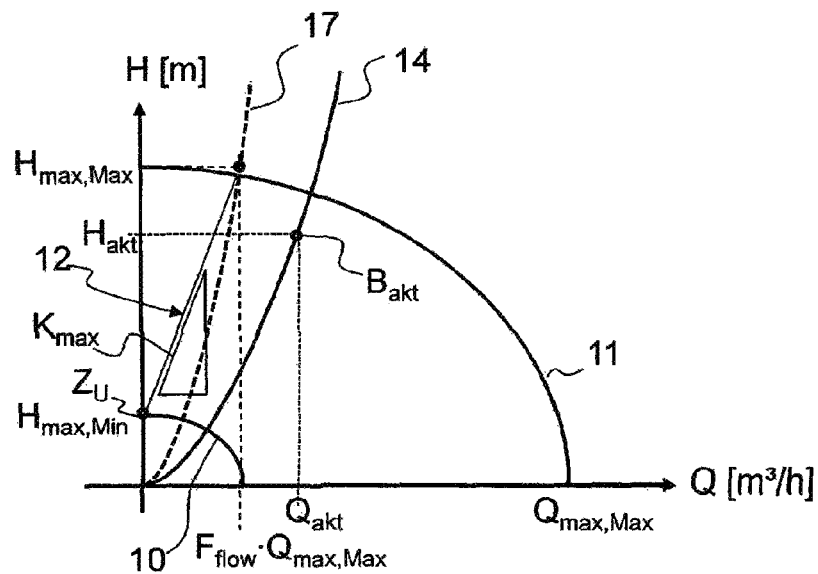
FIG. 10 is an HQ diagram for depicting the upper limit of the gain factor.

Thus, FIG. 10 shows limiting the gain factor K through a maximum value $K_{max}$ corresponding through the slope of a straight line 12 between a lower limit point and an upper limit point. The lower limit point lies here on the minimum pump curve 10 when the volumetric flow rate is zero. It thus corresponds, for example, to the lower target point $Z_U$. The upper limit point lies above the maximum pump curve 11. It is defined by the maximum delivery head $H_{max,Max}$ on the maximum pump curve 11 and the maximum volumetric flow rate $Q_{max,Max}$ on the maximum pump curve 11, having been weighted with a factor $F_{flow}$. The factor $F_{flow}$ is based on the maximum rate of change in the rotational speed of the centrifugal pump 3, and lies here between 10% and 20%. The upper limit point also ideally lies on the steepest system characteristic curve 17 of the hydraulic system 4. The maximum value $K_{max}$ may be calculated from $$K_{max} = (H_{max,Max} - H_{max,Min}) F_{flow} Q_{max,Max}$$

If the result of the calculation according to the above calculation instruction is that the gain factor K attains a value greater than the described maximum value $K_{max}$, the gain factor K is limited to this maximum value $K_{max}$. The calculation done through this maximum value ensures that a system characteristic curve can always still be calculated, even in the case of very low volumetric flow rates or in the case of a volumetric flow rate of zero. In addition, overreactions are avoided.

Figure 11:
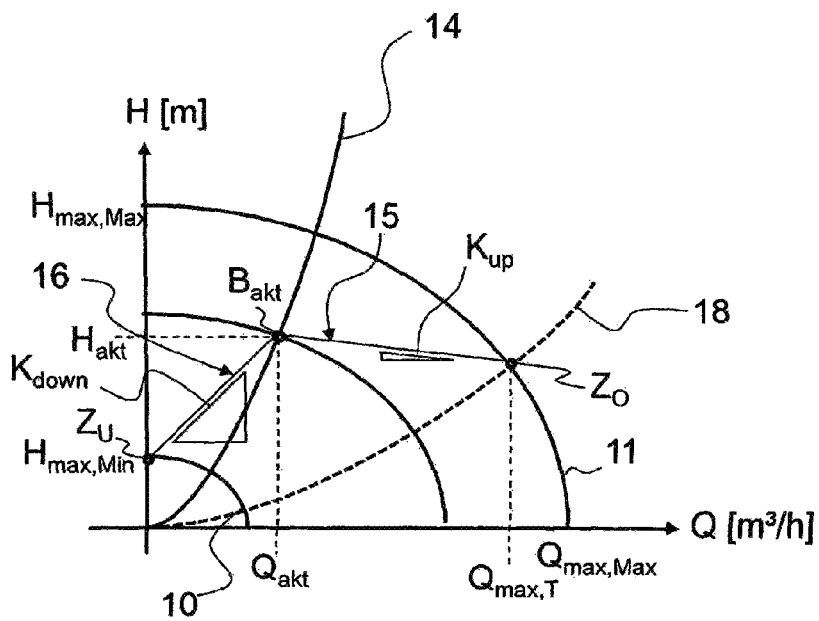
FIG. 11 is an HQ diagram for depicting the lower limit of the gain factor.

FIG. 11 shows a case where the gain factor $K_{up}$ calculated for a positive gradient is negative. Here, the flattest system characteristic curve 18 is deeper than the one in FIG. 9.

At this point, it should be noted that this shows that in FIG. 9, either the reference period T has not yet ended and the flattest system characteristic curve 18 is still occurring, as in FIG. 11, but is not yet known to the dynamic controller, or the state of the hydraulic system 4 with which the flattest system characteristic curve from FIG. 11 is associated simply does not occur in the reference period T observed in FIG. 9. This shows that the flattest system characteristic curve 13 in FIG. 9 is a relative, reference period-relevant flattest system characteristic curve, whereas the flattest system characteristic curve 18 in FIG. 11 is the absolutely flattest system characteristic curve.

At the current operating point $B_{akt}$ according to FIG. 11, the current delivery head $H_{akt}$ is greater than the delivery head $H_{max,T}$ associated with the upper target point $Z_O$. It thus is higher, as a result of which the straight gauge line 15 falls to the upper target point $Z_O$. The slope of the straight gauge line 15 and the calculated gain factor are thus negative.

The same may happen for the other straight gauge line 16 when, namely, the current delivery head $H_{akt}$ is smaller than the delivery head $H_{max,Min}$ associated with the lower target point $Z_U$ at the current operating point $B_{akt}$. It thus is deeper, as a result of which the other straight gauge line 16 rises to the lower target point $Z_O$. Thus the slope of the straight gauge line 15 is positive and the calculated gain factor $K_{down}$ is negative.

Because the positive feedback in these cases is converted into a negative feedback, the calculated gain factor $K_{up}$, $K_{down}$ is limited to a minimum value $K_{min}$. This amounts to zero if the gain factor gradually decreases to below zero. This means that the delivery head set-point value $H_{soll}$ in this case is not changed, i.e. the pump 3 is controlled on the same Δp–c characteristic curve for the next cycle. If, however, the calculated gain factor $K_{up}$ jumps from a positive value to a value below zero, it is then set to the last non-negative value. Negative values for the gain factor $K_{up}$ also arise when the operating point of the centrifugal pump 3 moves on the maximum pump curve 11.

A test for whether the calculated gain factor K is under the minimum value or exceeds the maximum value, including correction thereof, may be performed after step 50, but, in particular immediately after step 52 or 54.

In addition or as an alternative, it may be provided in the method according to the present invention to prohibit an upper target point $Z_O$ that, in terms of the delivery head $H_{ZO}=H_{max,T}$ thereof, lies below the delivery head $H_{max,Min}$ associated with the lower target point $Z_U$. Therefore, step 44 may be directly followed by a query of whether this condition is met. If the answer is affirmative, the delivery head $H_{ZO}$ for the upper target point is equated with the delivery head associated with the lower target point $Z_U$, $H_{ZU}=H_{max,Min}$. If the answer is negative, the determined delivery head $H_{ZO}$ remains unchanged.

As a further security measure, it may be provided to reset a newly measured volumetric flow rate value $Q_{akt}$ to the last-measured volumetric flow rate value $Q_{akt}$ if the new volumetric flow rate value $Q_{akt}$ is greater than the maximum volumetric flow rate value $Q_{max,Max}$ on the maximum pump curve 11. This is because this is not plausible. Such a measurement value may arise with faulty measurement, and may severely disrupt the method. The correction of the volumetric flow rate value $Q_{akt}$ may directly follow step 20.

Furthermore, as another security measure, it may be provided, as a result, to check the system characteristic curve 14 determined in step 41 for whether the steepness exceeds a maximum value $K_{max}$. This results when the one that passes through the upper limit point is allowed as the steepest system characteristic curve 17. The maximum slope value then arises from $$K_{max}=(H_{max,Max})/(F_{flow}Q_{max,Max})^2$$

Thus, step 41 may be immediately followed by a query of whether the slope K determined with the current system characteristic curve 14 exceeds the maximum value $K_{max}$. If this is the case, the slope is limited to this maximum value $K_{max}$.

As previously mentioned, the lower operating point may be changed, in particular raised, during operation of the centrifugal pump 3. This is necessary if the hydraulic system 4 contains a check valve for which the opening pressure lies above the delivery head $H_{ZU}$ associated with the lower target point $Z_U$. If the operating point $B_{akt}$ of the centrifugal pump 3 reaches the lower target point $Z_U$, the delivery head or the differential pressure built up by the pump 3 at this delivery head lies below the opening pressure of the check valve. This would then close and never reopen. In order to prevent this, the lower target point $Z_U$ is raised, for example, by 5% of the maximum delivery head $H_{max,Max}$ on the maximum pump curve 11. Then, $H_{ZU}=H_{ZU\_old}+0.05\times H_{max,Max}$ applies.

The raising may then be done when the volumetric flow rate $Q_{akt}$ lies below a predetermined limit value for a certain length of time. The existence of the check valve is tested for by this limit value. The limit value may be 1% of the maximum volumetric flow rate $Q_{max,Max}$ on the maximum pump curve, and the length of time may be 30 minutes.

With the method described here, any electric motor-driven centrifugal pump, in particular a heating pump, can be operated with the use of positive feedback between volumetric flow rate changes and the set-point delivery head with a gain factor that is optimal in every load state.

The invention claimed is:

1. A method of operating a centrifugal pump driven by an electric motor in a hydraulic system having a self-controlled load, the method comprising the steps of:
   operating the centrifugal pump with a first set-point delivery head;
   determining a gradient of a volumetric flow rate of the centrifugal pump;
   calculating a second set-point delivery head of the centrifugal pump from a mathematical linkage of the gradient and the first set-point delivery head, the gradient being weighted with a gain factor and the mathematical linkage describing a positive feedback between the set-point delivery head and the volumetric flow rate;
   determining a current operating point of the centrifugal pump;
   determining a current or a past state of the hydraulic system;
   determining the gain factor from a calculation instruction modified dynamically during operation of the centrifugal pump taking into consideration the current operating point of the centrifugal pump and the current or the past state of the hydraulic system; and
   operating the centrifugal pump with the second set-point delivery head.

2. The method according to claim 1, wherein the mathematical linkage is addition of the gradient weighted with the gain factor to the first set-point delivery head.

3. The method according to claim 1, wherein the calculation instruction describes a functional relationship between the current operating point and a target point and the gain factor is calculated from the functional relationship.

4. The method according to claim 3, wherein a slope of a straight gauge line between the current operating point and the target point is determined and used as the gain factor.

5. The method according to claim 3, wherein the target point in the case of a positive gradient is an upper target point characterized by a volumetric flow rate greater than the volumetric flow rate of the current operating point.

6. The method according to claim 5, further comprising the steps of:
   determining a current or past system characteristic curve of the hydraulic system, and
   determining a point on this system characteristic curve that forms the upper target point.

7. The method according to claim 6, further comprising the steps of:
   determining an intersection between the current or past system characteristic curve and a maximum pump curve of the centrifugal pump; and
   using the determined intersection as the upper target point.

8. The method according to claim 6, wherein the past system characteristic curve is the one that is flattest within a past reference period.

9. The method according to claim 8, wherein the reference period is between 12 and 48 hours.

10. The method according to claim 5, further comprising the step of:
    calculating the gain factor in the case of the positive gradient according to the calculation instruction $$K_{up}=(H_{ZO}-H_{akt})/(Q_{ZO}-Q_{akt})$$

where
   $K_{up}$ is the gain factor,
   $H_{ZO}$ is a delivery head associated with the upper target point,
   $H_{akt}$ is a delivery head associated with the current operating point,
   $Q_{ZO}$ is a volumetric flow rate associated with the upper target point, and
   $Q_{akt}$ is a volumetric flow rate associated with the current operating point.

11. The method according to claim 9, wherein the reference period is a sliding reference period.

12. The method according to claim 3, wherein the target point in the case of a negative gradient is a lower target point characterized by a volumetric flow rate lower than the volumetric flow rate of the current operating point.

13. The method according to claim 12, further comprising the step of:
calculating the gain factor in the case of the negative gradient according to the calculation instruction $$K_{down}=(H_{akt}-H_{ZU})/(Q_{akt}-Q_{ZU})$$

where
$K_{down}$ is the gain factor,
$H_{ZU}$ is a delivery head associated with the lower target point,
$H_{akt}$ is a delivery head associated with the current operating point,
$Q_{ZU}$ is a volumetric flow rate associated with the lower target point, and
$Q_{akt}$ is a volumetric flow rate associated with the current operating point.

14. The method according to claim 12, further comprising the step of:
raising the lower target point to a higher delivery head by 2% to 8% of a maximum delivery head on a maximum pump curve when the volumetric flow rate lies for a certain length of time below 0.1% of a maximum volumetric flow rate on the maximum pump curve.

15. The method according to claim 12, wherein the lower target point lies on a minimum pump curve of the centrifugal pump.

16. The method according to claim 12, wherein the lower target point is an operating point that, when the volumetric flow rate is zero, lies on a minimum pump curve of the centrifugal pump.

17. The method according to claim 3, wherein
the target point in the case of a positive gradient is an upper target point characterized by a volumetric flow rate greater than the volumetric flow rate of the current operating point and
the target point in the case of a negative gradient is a lower target point characterized by a volumetric flow rate lower than the volumetric flow rate of the current operating point the method further comprising the steps of:
determining the gain factor as a first gain factor corresponding to a slope of a first straight gauge line between the current operating point and the upper target point;
determining the gain factor as a second gain factor corresponding to the slope of a second straight gauge line between the current operating point and the lower target point; and
using the first gain factor when the gradient is positive and the second gain factor when the gradient is negative.

18. The method according to claim 3, wherein the target point lies on a minimum pump curve of the centrifugal pump.

19. The method according to claim 3, wherein the target point is an operating point that, when the volumetric flow rate is zero, lies on a minimum pump curve of the centrifugal pump.

20. The method according to claim 1, further comprising the step of cyclically repeating the steps of:
determining the gradient,
calculating the second set-point delivery head, and
determining the gain factor, whereby the second set-point delivery head becomes the first set-point delivery head after each cycle.

21. The method according to claim 20, wherein cyclically repeating is performed in intervals between 3 seconds and 15 minutes.

22. The method according to claim 1, further comprising the step of:
limiting the determined gain factor to a maximum value corresponding to a slope of a straight line between a lower limit point lying on or below a minimum pump curve and an upper limit point lying on or above a maximum pump curve of the centrifugal pump.

23. The method according to claim 22, further comprising the step of:
setting the upper limit point at an intersection between the maximum pump curve and a steepest system characteristic curve of the hydraulic system.

24. The method according to claim 22, wherein the upper limit point is defined by a maximum delivery head on the maximum pump curve and 10% to 20% of a maximum volumetric flow rate on the maximum pump curve.

25. The method according to claim 1, further comprising the step of:
limiting the determined gain factor to a minimum value of zero.

26. The method according to claim 1, further comprising the step of:
setting the determined gain factor to a last non-negative value if the determined value of the gain factor is negative.

27. The method according to claim 1, further comprising the step of:
determining a current volumetric flow rate in order to determine the current operating point, and
resetting a newly determined volumetric flow rate value to the last determined volumetric flow rate value if the newly determined volumetric flow rate value is greater than a maximum volumetric flow rate on a maximum pump curve.

28. The method according to claim 1, wherein the gradient is calculated from a number of slidingly averaged volumetric flow rate values.

29. The method according to claim 1, wherein the gradient is averaged slidingly from a certain number of values.

* * * * *